United States Patent
Tse et al.

(10) Patent No.: US 9,109,143 B2
(45) Date of Patent: Aug. 18, 2015

(54) POLYPROPYLENE-BASED ADHESIVE COMPOSITIONS

(75) Inventors: Mun Fu Tse, Seabrook, TX (US);
Cynthia A. Mitchell, Houston, TX (US);
Sudhin Datta, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 13/819,825

(22) PCT Filed: Oct. 12, 2011

(86) PCT No.: PCT/US2011/055875
§ 371 (c)(1),
(2), (4) Date: May 3, 2013

(87) PCT Pub. No.: WO2012/051239
PCT Pub. Date: Apr. 19, 2012

(65) Prior Publication Data
US 2013/0225752 A1   Aug. 29, 2013

Related U.S. Application Data

(60) Provisional application No. 61/393,728, filed on Oct. 15, 2010.

(51) Int. Cl.
| C08L 53/00 | (2006.01) |
| B01F 17/00 | (2006.01) |
| C08F 112/08 | (2006.01) |
| C09J 123/14 | (2006.01) |
| C08L 23/10 | (2006.01) |
| C09J 123/10 | (2006.01) |
| C08L 23/14 | (2006.01) |

(52) U.S. Cl.
CPC .............. *C09J 123/14* (2013.01); *C08L 23/10* (2013.01); *C09J 123/10* (2013.01); *C08L 23/14* (2013.01); *C08L 2205/02* (2013.01)

(58) Field of Classification Search
CPC . C08L 23/10; C08L 2205/02; C08L 2666/06; C09J 123/10; C09J 123/14
USPC .................................. 524/505, 528; 526/348
See application file for complete search history.

(56) References Cited

U.S. PATENT DOCUMENTS

| 4,178,272 A | 12/1979 | Joyner et al. |
| 4,345,349 A | 8/1982 | Flanagan |
| 4,394,915 A | 7/1983 | Nelson |
| 5,118,762 A | 6/1992 | Chin |
| 2003/0096896 A1 | 5/2003 | Wang et al. |
| 2010/0076128 A1* | 3/2010 | Abhari et al. .................. 524/112 |

FOREIGN PATENT DOCUMENTS

| EP | 1911825 | 8/1992 |
| EP | 2045304 | 4/2009 |
| JP | 04-236288 | 8/1992 |
| JP | 2000-226561 | 8/2000 |
| WO | 1997033921 | 9/1997 |

* cited by examiner

*Primary Examiner* — William Cheung

(57) ABSTRACT

The present invention is related to adhesive compositions and their applications. In particular, the adhesive compositions described herein comprise a two or more propylene-based copolymers with varying comonomer content.

24 Claims, No Drawings

POLYPROPYLENE-BASED ADHESIVE COMPOSITIONS

PRIORITY CLAIM

This application is a National Stage Application of International Application No. PCT/US2011/055875 filed Oct. 12, 2011, which claims priority to and the benefit of U.S. Provisional Application Ser. No. 61/393,728, which was filed Oct. 15, 2010, both of which are fully incorporated herein by reference in their entireties.

CROSS REFERENCE TO RELATED APPLICATIONS

This application is related to U.S. patent application Ser. No. 09/745,394, entitled "Propylene-based Adhesive Compositions" filed Dec. 21, 2000.

FIELD OF THE INVENTION

The present invention is related to polypropylene-based adhesive compositions and their applications. In particular, the adhesive compositions described herein comprise copolymers of propylene and ethylene or copolymers of propylene and at least one $C_4$ to $C_{20}$ α-olefin, preferably a $C_4$ to $C_8$ α-olefin where the propylene is the predominant monomer and the copolymer is semi-crystalline.

BACKGROUND OF THE INVENTION

Hot melt adhesives are thermoplastic materials that can be heated to a melt and then applied to various substrates. A bond is formed upon cooling and resolidification. Among the most widely used thermoplastic polymers in hot melt adhesives is ethylene-vinyl acetate copolymer ("EVA") which is combined with a variety of plasticizers, tackifiers, antioxidants, waxes, and extenders for purposes of improving and/or controlling the viscosity, adhesive properties, shelf-life, stability and cost. Plasticizers have typically included such compounds as polybutenes and phthalates, tackifiers have typically included such compositions as rosin esters and hydrocarbon resins, antioxidants are frequently based upon the known hindered phenol compounds, and wax helps to reduce the melt viscosity in addition to reducing costs.

These hot melt adhesives have the drawback of often becoming brittle below the glass-transition temperature. Historically, ethylene based semi-crystalline polymers like polyethylene and ethylene vinyl acetate copolymer (EVA) have been used in various adhesive applications; however, such polymers have many problems in their end use applications. For example, semi-crystalline linear low density polyethylene (LLDPE) can be used in hot melt adhesive applications where the crystalline network formed on cooling makes a good adhesive free of tack, but the high level of crystallinity causes the material to be brittle. For this reason other monomers, such as vinyl acetate (VA), or alpha-olefins are often co-polymerized with ethylene to break up some of the crystallinity and soften the adhesive. Thus the use of hot melt adhesives based upon EVA is limited when low temperature conditions of use are desired.

Styrene block copolymers ("SBC") are independently known as an important class of base polymers for adhesive compositions, particularly for such uses as in hot melt pressure sensitive adhesives in tapes, label stock, diaper assembly and the like. However, because of higher melt viscosities than EVA based compositions, SBC based adhesive compositions are not typically used for packaging where high-speed application is economically desirable.

Certain adhesive composition blends of SBC and EVA are known, even though the base polymers are largely incompatible, in the sense of not being able to form stable blends largely free of separation or stratification and resulting non-uniformity of properties. U.S. Pat. No. 4,345,349 describes book-binding hot melt adhesive compositions prepared from 15-30 wt % SBC, 5-10 wt % EVA, 25-40 wt % rosin ester tackifier, 25-35 wt % wax diluent and 0.5-3 wt % of a stabilizer, e.g., hindered phenol compound. The weight ratio of SBC to the ethylene vinyl acetate copolymer is from 1.75/1 to 6/1. The low-temperature flexibility improves by increasing the amount of SBC in the composition and using a high softening point tackifier or high melting point wax shortens setting speed. Setting time, in order to be useful in the described bookbinding process, is to be within 30 seconds, and times within 26 seconds are exemplified. U.S. Pat. No. 4,394,915 describes a hot melt adhesive particularly suitable for poly(ethylene-terephthalate) (PET) bottle assemblies comprising typically 20-40 wt % SBC, 5-20 wt % EVA, 30-60 wt % tackifying resin, 10-30 wt % wax or oil, and 0.1-4 wt % stabilizer. The tackifying resin can be any of a number of available rosins or resins, including the aliphatic petroleum resins, but is preferably a polymerized tall oil rosin.

PCT/US97/04161 teaches the use of ethylene based copolymers as hot melt adhesive and these materials are useful in some applications, but suffer in that they have higher melt viscosity, poorer processing and poorer adhesion to some types of surfaces than propylene based copolymers. U.S. Pat. No. 5,118,762 addresses the industrial need for hot melt adhesives that have a low melt viscosity and high temperature resistance to shear. The solution in this document is the use of a predominantly branched styrene-isoprene-styrene (SIS) triblock copolymer with a tackifying resin that is compatible with the elastomeric isoprene block, e.g., diene-olefin copolymer resins, rosin esters or saturated petroleum resins, e.g., hydrogenated dicyclopentadiene resins such as ESCOREZ® 5000 series resins of the ExxonMobil Chemical Company.

The present invention is directed in general to providing improved adhesive compositions, and processes or methods for making such compositions.

SUMMARY

The present invention is directed to adhesive compositions and their commercial applications. In one or more embodiments, the adhesive compositions comprise a first propylene-based copolymer component comprising propylene and at least one comonomer wherein the first copolymer has a propylene content of greater than 50 mol % and a weight average molecular weight of 100,000 or less. The compositions further comprise a second propylene-based copolymer component comprising propylene and at least one comonomer wherein the second copolymer component has a propylene content of greater than 50 mol %, a comonomer content of at least 2 mol % greater than the comonomer content of the first copolymer, and a weight average molecular weight (Mw) of 100,000 or less. The resulting adhesive composition demonstrates good set time and fiber tear.

DETAILED DESCRIPTION OF THE INVENTION

One or more specific embodiments of the present invention relates to an adhesive composition comprising at least one propylene-based copolymer comprising propylene and at least one comonomer selected from the group consisting of ethylene and at least one $C_4$ to $C_{20}$ α-olefin, the copolymer having a weight average molecular weight (Mw) from about 5,000 to about 200,000; a melt flow rate (MFR) of greater than 1 dg/min (ASTM D-1238, 2.16 kg weight @230° C.). Further embodiments of the adhesive compositions described herein and their individual components are described in greater detail below.

As used herein, the term "copolymer" is meant to include polymers having two or more monomers, optionally with other monomers, and may refer to interpolymers, terpolymers, etc. The term "polymer" as used herein includes homopolymers and copolymers.

Propylene-Based Polymer Component

In one or more embodiments of the present invention, the adhesive compositions described herein comprise a propylene-based polymer component, which in turn comprises one or more propylene-based polymer(s). In one embodiment, the propylene-based polymer component is a random copolymer and in other embodiments the propylene-based polymer component is an elastomeric random copolymer. In some embodiments, the propylene-based polymers comprise propylene and from about 3 to about 50 mole % (mol %) units derived from ethylene and/or a $C_4$-$C_{10}$ alpha-olefin or from about 2 to about 40 mol % units derived from ethylene and/or a $C_4$-$C_{10}$ alpha-olefin. In another embodiment, the comonomer may comprise at least one $C_4$ to $C_8$ α-olefin. In one or more embodiments, the alpha-olefin comonomer units may derive from ethylene, 1-butene, 1-hexene, 4-methyl-1-pentene, 1-octene, and/or 1-decene, preferably 1-hexene and 1-octene. The embodiments described below are discussed with reference to ethylene as the alpha-olefin comonomer, but the embodiments are equally applicable to other propylene copolymers with other alpha-olefin comonomers, or to propylene terpolymers with ethylene and another alpha-olefin comonomer. In this regard, the copolymer may simply be referred to as propylene-based polymers with reference to ethylene as the alpha-olefin.

In one embodiment, the propylene-based polymers may include alpha-olefin derived comonomer. In another embodiment, the propylene-based polymers comprise at least about 2 wt %, at least about 3 wt %, at least about 5 wt %, at least about 6 wt %, at least about 8 wt %, or at least about 10 wt % of at least one comonomer selected from the group consisting of ethylene, $C_4$ to $C_{20}$ alpha-olefins, and combination thereof. In those or other embodiments, the propylene-based polymers may include up to about 40 wt %, or up to about 30 wt %, or up to about 25 wt %, or up to about 20 wt %, or up to about 18 wt %, or up to about 16 wt %, or up to about 12 wt % of at least one comonomer selected from the group consisting of ethylene, $C_4$ to $C_{20}$ alpha-olefin, and combination thereof, where the percentage by weight is based upon the total weight of the propylene-derived and alpha-olefin derived units. Stated another way, the propylene-based polymers may include at least about 60 wt %, or at least about 70 wt %, or at least about 75 wt %, or at least about 80 wt %, or at least about 82 wt % propylene-derived units; and in these or other embodiments, the copolymers may include up to about 98 wt %, or up to about 97 wt %, or up to about 95 wt %, or up to about 94 wt %, or up to about 92 wt %, or up to about 90 wt % propylene-derived units, where the percentage by weight is based upon the total weight of the propylene-derived and alpha-olefin derived units.

In another embodiment, the propylene-based polymers comprise at least about 1 mol %, 2 mol %, 3 mol %, at least about 4 mol %, at least about 5 mol %, at least about 6 mol %, at least about 7 mol %, at least about 8 mol %, at least about 9 mol %, at least about 10 mol %, at least about 11 mol %, at least about 12 mol %, at least about 13 mol %, at least about 14 mol %, or at least about 15 mol % of at least one comonomer selected from the group consisting of ethylene, $C_4$ to $C_{20}$ alpha-olefins, and combination thereof. In those or other embodiments, the propylene-basd polymers may include up to about 50 mol %, or up to about 40 mol %, or up to about 33 mol %, or up to about 27 mol %, or up to about 25 mol %, or up to about 22 mol %, or up to about 17 mol % of at least one comonomer selected from the group consisting of ethylene, $C_4$ to $C_{20}$ alpha-olefin, and combination thereof, where the percentage by weight is based upon the total weight of the propylene-derived and alpha-olefin derived units. Stated another way, the propylene-based polymers may include at least about 50 mol %, or at least about 60 mol %, or at least about 67 mol %, or at least about 73 mol %, or at least about 75 mol %, or at least about 78 mol %, or at least about 83 mol % propylene-derived units; and in these or other embodiments, the copolymers may include up to about 97 mol %, or up to about 95 mol %, or up to about 95 mol %, or up to about 93 mol %, or up to about 88 mol %, or up to about 86 mol % propylene-derived units, where the mole percentage is based upon the total number of moles of the propylene-derived and alpha-olefin derived units.

The propylene-based polymers of one or more embodiments are characterized by having a single melting temperature as determined by differential scanning calorimetry (DSC). The melting point is defined as the temperature of the greatest heat absorption within the range of melting of the sample. The propylene-based polymer may show secondary melting peaks adjacent to the principal peak, but for purposes herein, these secondary melting peaks are considered together as a single melting point, with the highest of these peaks being considered the melting point (Tm) of the propylene-based polymer.

In one or more embodiments, the Tm of the propylene-based polymers (as determined by DSC) is less than about 130° C., or less than about 120° C., or less than about 110° C., or less than about 105° C., or less than about 100° C., or less than about 95° C., or less than about 90° C., or less than about 80° C., or less than about 70° C.

In one or more embodiments, the propylene-based polymers may be characterized by a heat of fusion (Hf), as determined by DSC. In one or more embodiments, the propylene-based copolymer may be characterized by a heat of fusion that is at least about 0.5 Joules/gram (J/g), or at least about 1.0 J/g, or at least about 1.5 J/g, or at least about 3.0 J/g, or at least about 4.0 J/g, or at least about 6.0 J/g, or at least about 7.0 J/g. In these or other embodiments, the propylene-based copolymer may be characterized by a heat of fusion of less than about 120 J/g, less than about 100 J/g, or less than about 90 J/g, or less than about 80 J/g, or less than about 75 J/g or less than about 70 J/g, or less than about 65 J/g, or less than about 60 J/g, or less than about 55 J/g, or less than about 50 J/g, or less than about 45 J/g, or less than about 40 J/g, or less than about 35 J/g, or less than about 30 J/g. The heat of fusion may be reduced by using additional comonomer, operating at higher polymerization temperatures, and/or using a different catalyst that provides reduced levels of steric constraints and favors more propagation errors for propylene insertion.

The propylene-based polymer can have a triad tacticity of three propylene units, as measured by $^{13}C$ NMR, of 75% or greater, 80% or greater, 82% or greater, 85% or greater, or 90% or greater. In one or more embodiments, ranges include from about 50% to about 99%, in other embodiments from about 60% to about 99%, in other embodiments from about 75% to about 99%, in other embodiments from about 80% to about 99%, and in other embodiments from about 60% to about 97%. Triad tacticity is determined by the methods described in U.S. Patent Application Publication No. 2004/0236042. If the triad tacticity of the copolymer is too high, the level of stereo-irregular disruption of the chain is too low and the material may not be sufficiently flexible for its purpose in a coating or tie layer. If the triad tacticity is too low, the bonding strength may be too low.

In one or more embodiments, the propylene-based polymer may have a crystallinity of from about 0.5% to about 50%, from about 0.5% to about 40%, or from about 1% to about 30%, or from about 5% to about 25%, determined according to DSC procedures. Crystallinity may be determined by dividing the heat of fusion of a sample by the heat of fusion of a 100% crystalline polymer, which is assumed to be 189 joules/gram for isotactic polypropylene or 350 joules/gram for polyethylene.

In one or more embodiments, the propylene-based polymer may have a density of from about 0.85 g/cm$^3$ to about 0.92 g/cm$^3$, or from about 0.87 g/cm$^3$ to about 0.90 g/cm$^3$, or from about 0.88 g/cm$^3$ to about 0.89 g/cm$^3$ at room temperature as measured per the ASTM D-792 test method.

In one or more embodiments, the propylene-based polymer may have a melt flow rate (MFR), as measured according to the ASTM D-1238, 2.16 kg weight @230° C., greater than or equal to about 0.3 dg/min, or at least about 0.5 dg/min, or at least about 0.8 dg/min, or at least about 1.0 dg/min. In these or other embodiments, the melt flow rate may be equal to or less than about 7000 dg/min, or less than about 6000 dg/min, or less than about 5000 dg/min, or less than about 4000 dg/min, or less than about 3000 dg/min, or less than about 2000 dg/min, or less than about 1000 dg/min, or less than about 900 dg/min, or less than about 700 dg/min, or less than about 500 dg/min, 350 dg/min, or less than about 250 dg/min, or less than about 100 dg/min.

In one or more embodiments, the propylene-based polymer may have a melt flow rate (MFR), as measured according to the ASTM D-1238, 2.16 kg weight @230° C., greater than or equal to about 250 dg/min, greater than or equal to about 500 dg/min, or greater than or equal to about 1,000 dg/min, or greater than or equal to about 1,500 dg/min, greater than or equal to about 2,000 dg/min, or greater than or equal to about 2,500 dg/min, or greater than or equal to about 3,000 dg/min.

In one or more embodiments, the propylene-based polymer can have a weight average molecular weight (Mw) of about 100,000 g/mole or less, for example, from about 5,000 to about 100,000 g/mole, or from about 5,000 to about 75,000 g/mole, or from about 5,000 to about 50,000 g/mole, or from about 10,000 to about 50,000 g/mole, or from about 20,000 to about 50,000 g/mole, or from about 30,000 to about 50,000 g/mole, or from about 35,000 to about 50,000 g/mole.

In one or more embodiments, the propylene-based polymer can have a number average molecular weight (Mn) of from about 2,500 to about 50,000 g/mole, or from about 2,500 to about 37,500 g/mole, or from about 2,500 to about 25,000 g/mole, or from about 15,000 to about 25,000 g/mole.

In one or more embodiments, the propylene-based polymer can have a Z-average molecular weight (Mz) of from about 10,000 to about 7,000,000 g/mole, or from about 50,000 to about 1,000,000 g/mole, or from about 80,000 to about 700,000 g/mole, or from about 100,000 to about 500,000 g/mole.

In one or more embodiments, the molecular weight distribution (MWD=(Mw/Mn)) of the propylene-based polymer may be from about 1 to about 40, or from about 1 to about 15, or from about 1.8 to about 5, or from about 1.8 to about 3.

Techniques for determining the molecular weight (Mn, Mw and Mz) and molecular weight distribution (MWD) may be found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al.), which is herein incorporated by reference for purposes of U.S. practices, and references cited therein. For example, molecular weight may be determined by size exclusion chromatography (SEC) by using a Waters 150 gel permeation chromatograph equipped with the differential refractive index detector and calibrated using polystyrene standards.

Specifically, molecular weights number average molecular weight (Mn), weight average molecular weight (Mw), and z-average molecular weight (Mz)) were determined using a Polymer Laboratories Model 220 high temperature SEC with on-line differential refractive index (DRI), light scattering, and viscometer detectors. It used three Polymer Laboratories PLgel 10 m Mixed-B columns for separation, a flow rate of 0.54 cm$^3$/min, and a nominal injection volume of 300 μL. The detectors and columns are contained in an oven maintained at 135° C. The light scattering detector is a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The stream emerging from the SEC columns is directed into the miniDAWN optical flow cell and then into the DRI detector. The DRI detector is an integral part of the Polymer Laboratories SEC. The viscometer is a high temperature viscometer purchased from Viscotek Corporation and comprising four capillaries arranged in a Wheatstone bridge configuration with two pressure transducers. One transducer measures the total pressure drop across the detector, and the other, positioned between the two sides of the bridge, measures a differential pressure. The viscometer is inside the SEC oven, positioned after the DRI detector. The details of these detectors as well as their calibrations have been described by, for example, T. Sun, P. Brant, R. R. Chance, and W. W. Graessley, in *Macromolecules*, Volume 34, Number 19, 6812-6820, (2001), incorporated herein by reference.

Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

In another embodiment, the propylene-based polymers described above also have a viscosity (also referred to a Brookfield Viscosity or Melt Viscosity) of 90,000 mPa·sec or less at 190° C. (as measured by ASTM D 3236 at 190° C.); or 80,000 or less, or 70,000 or less, or 60,000 or less, or 50,000 or less, or 40,000 or less, or 30,000 or less, or 20,000 or less, or 10,000 or less, or 8,000 or less, or 5,000 or less, or 4,000 or less, or 3,000 or less, or 1,500 or less, or between 250 and 15,000 mPa·sec, or between 500 and 15,000 mPa·sec, or between 1,000 and 15,000 mPa·sec, or between 1,500 and 15,000 mPa·sec, or between 2,000 and 15,000, or between 3,000 and 15,000, or between 4,000 and 15,000, or between 5,000 and 15,000, or between 2,500 and 12,500, or between 3,000 and 12,000, or between 3,500 and 11,000, or between 4,000 and 10,000, or between 5,000 and 10,000 or between 500 and 10,000 mPa·sec, or between 500 and 9,000 mPa·sec, or between 500 and 8,000 mPa·sec, or between 500 and 7,000 mPa·sec, or between 500 and 6,000 mPa·sec, or between 500 and 5,000 mPa·sec, or between 500 and 4,000 mPa·sec, or between 500 and 3,000 mPa·sec.

In another embodiment, the propylene-based polymers described above also have a viscosity (also referred to a Brookfield Viscosity or Melt Viscosity) of greater than 250 mPa·sec at 190° C. (as measured by ASTM D 3236 at 190° C.), or greater than 500 mPa·sec, or greater than 1,000 mPa·sec, or greater than 2,000 mPa·sec, or greater than 3,000 mPa·sec, or greater than 4,000 mPa·sec, or greater than 5,000 mPa·sec.

In one or more embodiments, the adhesive compositions described herein may comprise from about 5 wt % to about 90 wt %, or from about 5 wt % to about 80 wt %, or from about 10 wt % to about 60 wt % of the propylene-based polymer component.

Preparation of the Propylene-Based Polymer

The triad tacticity and tacticity index of the propylene based polymer may be controlled by a catalyst which influences the stereoregularity of propylene placement, the polymerization temperature, according to which stereoregularity can be reduced by increasing the temperature, and by the type and amount of a comonomer which tends to disrupt reduce the level of longer propylene derived sequences.

Too much comonomer will reduce the crystallinity provided by the crystallization of stereoregular propylene derived sequences to the point where the material lacks strength; too little and the material will be too crystalline. The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis.

Reference is made to U.S. Pat. No. 6,525,157, which describes test methods that are fully applicable for the various measurements referred to in this specification and claims and which contains more details on the determination of ethylene content by NMR.

The catalyst may also control the stereoregularity in combination with the comonomer and the polymerization temperature. The catalyst should, however, be capable of a level of stereoregular placement, generally by suitable chirality of the catalyst.

In one embodiment, the polymer can be prepared using any single sited metallocene catalyst. Such a catalyst may be a transition metal complex generally containing a transition metal Groups 3 to 10 of the Periodic Table and at least one ancillary ligand that remains bonded to the transition metal during polymerization. Preferably the transition metal is used in a reduced cationic state and stabilized by a cocatalyst or activator.

The ancillary ligand may be a structure capable of forming a r bond such as a cyclopentadienyl type ring structure (See EP 129368, EP 284708, Rieger EP 1070087 and U.S. Pat. No. 6,559,262). The ancillary ligand may also be a pyridinyl or amide ligand (See WO2003/040201). The transition metal is preferably of Group 4 of the Periodic table such as titanium, hafnium or zirconium, which is used in polymerization in the mono-valent cationic state and has one or two ancillary ligands as described in more detail hereafter. The important features of such catalysts for coordination polymerization are the ligand capable of abstraction and that ligand into which the ethylene (olefinic) group can be inserted.

The manner of activation of the single site catalyst can vary. Alumoxane and preferably methyl alumoxane can be used suitably in an amount to provide a molar aluminum to metallocene ratio of from 1:1 to 20,000:1. Higher molecular weights can be obtained using non-or weakly coordinating anion activators (NCA) derived and generated in any of the ways amply described in published patent art such as EP 277004, EP 426637, EP 426638 and many others. The non-coordinating anion can be a Group 10-14 complex wherein boron or aluminum is the charge-bearing atom shielded by ligands, which may be halogenated, and especially perfluorinated. Preferably, tetra-aryl-substituted Group 10-14 non-carbon element-based anion, especially those that have fluorine groups substituted for hydrogen atoms on the aryl groups, or alkyl substituents on those aryl groups. The non-coordinating anion may be used in approximately equimolar amounts relative to the transition metal complex, such as at least 0.25, preferably 0.5, and especially 0.8 and such as no more than 4, preferably 2 and especially 1.5. Further options are described in U.S. Pat. No. 6,048,950; WO1998/27154; U.S. Pat. Nos. 6,448,358; 6,265,212, 5,198,401 and 5,391,629.

The polymerization reaction is conducted by reacting monomers in the presence of a metallocene catalyst system described herein at a temperature of from 0° C. to 200° C. for a time of from 1 second to 10 hours. Preferably, homogeneous conditions are used, such as a continuous solution process or a bulk polymerization process with excess monomer used as diluent. The continuous process may use some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used. Reactors may be cooled by reactor jackets or cooling coils, autorefrigeration, prechilled feeds or combinations of all three to absorb the heat of the exothermic polymerization reaction. Autorefrigerated reactor cooling requires the presence of a vapor phase in the reactor. Adiabatic reactors with prechilled feeds are preferred in which the polymerization exotherm is absorbed by permitting a temperature rise of the polymerizing liquid. Also, one propylene-based copolymer component can be prepared in one reactor and the other propylene-based copolymer component can be prepared in another reactor. The polymerizates of the two propylene-based copolymer components in any prescribed ratios can be subsequently mixed together to form the base polymer of the adhesive composition of this invention as described herein.

Degradation of the Propylene-Based Polymer

The term "degradation" as used herein refers to the process by which the melt flow rate of a material is increased, reflecting a lowering of molecular weight (i.e., to attain low molecular weight polymers from polymers of much higher molecular weight). Another term that is deemed to mean the same thing as "degraded" herein is "visbroken." Preferably, a free radical initiator is used to cause the increase in MFR. A polymer is degraded in accordance with this invention when the polymer, or a blend of polymers, is treated with a free radical initiator, e.g., peroxide, preferably while the polymer is in a melted state, more preferably in a fully melted state. Preferably, the degradation of the polymer or a blend of polymers involves controlled chain scission. For example, when a free radical initiator is used, free radicals of the polymers being treated are produced by thermal scission of the peroxide. Other sources of free radicals such as diazo compounds may also be utilized. In any case, it is contemplated that the free radicals produced from the initiator (e.g., peroxide) abstract the tertiary hydrogen on the propylene residue of the random copolymers. The resulting free radical disproportionates to two lower molecular weight chains, one with an olefin near the terminus and the other a saturated polymer. This process can continue with the generation of successively lower molecular weight polymers. Since the site of the attack and scission of the chains is random, the distribution of the molecular weight of the resulting degraded polymer approaches the most probable (MWD=2) irrespective of the MWD of the initial polymer, where "MWD" refers to Molecular Weight Distribution or Polydispersity Index, defined as Mw/Mn, where Mw and Mn are measured by GPC. Thus, under the appropriate conditions, chain scission is initiated to cause degradation of the polymer or polymer blend.

In one embodiment, the chain scission procedure may be used for both a composition that includes a random copolymer and a composition that includes a blend of the random copolymer and a crystalline polymer, e.g., isotactic polypropylene. The chain scission procedure may include heating the polymer, or polymer blend, to a molten state in the presence of a free radical initiator, i.e., an agent capable of producing free radicals. In the case of a blend, the polymer components may both be simultaneously treated with the free radical initiator, to cause the desired level or degree of degradation. Alternatively, only one of the components may be treated with the free radical initiator, to cause the desired level or degree of degradation, following which the other component may then be added after degradation has begun or been completed. In either case, the temperature of the polymer, or blend, should be sufficiently high when the initiator is present to maintain all of the components in the molten state. The degradation may be performed in any number of environments, using conventional mixing procedures. When a batch mode is used, degradation should be carried out in an intensive mixer such as a masticator or a Brabender mixer. When a continuous mode is used, degradation should be carried out in an extruder to which the components should be continuously fed. It is understood that the molecular weights of the individual blend components (e.g., the random copolymer and the isotactic polypropylene) after chain scission are related to the initial molecular weights of each component. However, each of the components undergoes chain scission at separate rates. Accordingly, the molecular weights of the initial components should be adjusted to obtain the desired molecular weight distribution in the final composition after chain scission. Also, chain scission of the random copolymer leads to branching, which is desirable for the adhesive composition.

In one embodiment, the free radical initiator is a peroxide, and an organic peroxide in another embodiment, wherein at least a methyl group or higher alkyl or aryl is bound to one or both oxygen atoms of the peroxide. In yet another embodiment, the free radical initiator is a sterically hindered peroxide, wherein the alkyl or aryl group associated with each oxygen atom is at least a secondary carbon, a tertiary carbon in another embodiment. Non-limiting examples of sterically hindered peroxides ("visbreaking agents") includes 2,5-bis (tert-butylperoxy)-2,5-dimethylhexane, 2,5-dimethyl-2,5-bis-(t-butylperoxy)-hexyne-3,4-methyl-4-t-butylperoxy-2-pentanone, 3,6,6,9,9-pentamethyl-3-(ethylacetate)-1,2,4,5-textraoxy cyclononane, and $\alpha,\alpha'$-bis-(tert-butylperoxy) diisopropyl benzene, and mixtures of these and any other secondary- or tertiary-hindered peroxides.

Another process that may occur during degradation, and that competes with chain scission, is crosslinking. In a crosslinking reaction, the free radicals combine to form branched macromolecules of higher molecular weight. Eventually, this synthesis reaction may lead to vulcanization of the polymer. In copolymers of ethylene and propylene, this balance of crosslinking and degradation is mainly dependent on the composition of the copolymer. Since the degradation reaction is uniquely associated with the propylene residues, lower amounts of propylene in the copolymer tend to favor crosslinking over degradation. However, it should be recognized that the scission and crosslinking reactions are not mutually exclusionary. That is, even during degradation, some amount of branching may occur. However, because the branching and scission reactions are random, these complementary processes should not lead to an increase in MWD. However, a polymeric material degraded as discussed herein preferably has a majority of branched molecules. The amount of branching depends on a number of variables, primarily the reaction conditions, the composition of the polymers and the extent of degradation. Random copolymers having a higher ethylene content should generate a higher level of branching than those with a lower ethylene content. When the increase in MFR is small (factor of 2 or 3), then the extent of branching in the resulting polymer should be minor However, when the extent of degradation of the polymer is relatively large (e.g., ratio of final to starting MFR is 20 or greater), then the amount of branching in the low molecular weight materials should be considerable. Thus, in certain embodiments of this invention, the rate or extent of degradation is substantially proportional to the relative amounts of propylene and ethylene sites. For example, if too many ethylene sites are present, the use of the peroxide or other free radical initiator may result in crosslinking rather than chain scission, and the material being treated will not degrade to a higher MFR. Thus, an important aspect of certain specific embodiments of this invention relates to the relative amounts of the polymers used in the blend. It is recognized by the inventors that the random copolymer and a polypropylene degrade independently. It is contemplated that the polypropylene degrades faster than the random copolymer under similar conditions. Thus, a blend of random copolymer and polypropylene with change in MWD during the degradation procedure with the polypropylene degrading to a lower molecular weight sooner than the random copolymer.

In one embodiment, the degradation process includes (a) providing a first polymer composition having an MFR less than 250 dg/min. at 230° C. and including a random copolymer produced by copolymerizing propylene and at least one of ethylene or alpha-olefin having 8 or less carbon atoms, the random copolymer having a crystallinity at least about 2% and no greater than about 65% derived from stereoregular polypropylene sequences and a melting point of from about 25° C. to about 105° C.; and (b) contacting the first polymer composition, in the melted state, with a free radical initiator, to provide a second polymer composition, wherein the second polymer composition has an MFR greater than 250 dg/min. at 230° C.

In another embodiment, the propylene-based polymer component(s) of the present may be functionalized such that the propylene-based polymer component(s) are contacted with a functional group, and optionally a catalyst, heat, initiator, or free radical source to cause all or part of the functional group to incorporate, graft, bond to, physically attach to, and/or chemically attach to the polymer.

Blending of the Propylene-Based Polymer Components

In one embodiment, the adhesive composition may comprise two or more of any of the propylene-based polymers described herein. In another embodiment, the adhesive composition described herein may be a hot melt adhesive. In another embodiment, the adhesive composition may comprise a first propylene-based copolymer component comprising propylene and at least one comonomer wherein the first copolymer has a propylene content of greater than 50 wt %, a comonomer content of less than 10 wt % or comonomer content less than 14 mol %; and a second propylene-based copolymer component comprising propylene and at least one comonomer wherein the first copolymer has a propylene content of greater than 50 wt %, a comonomer content of greater than 10 wt % or comonomer content greater than 14 mol %. The first and second propylene-based copolymers may be a random copolymer. The first and second propylene-based copolymers may also be a random copolymer. The comonomer of the first and second propylene-based copolymers may be the same or different. In one embodiment, the comonomer of the first and second propylene-based copolymer will both be ethylene. Unexpectedly, it has been shown that an adhesive comprising at least two propylene-based polymers with varying comonomer content produces an adhesive composition with an acceptable balance of reduced set time and increase fiber tear. Without being bound by theory, it is believed that propylene polymer having the lower ethylene content (less than 10 wt % or less than 14 mol %) provides reduced set time and the propylene polymer having the higher ethylene content (i.e., greater than 10 wt % or greater than 14 mol %) provides increased adhesion resulting in improved fiber tear results. In one embodiment, the first and second propylene component may be a degraded (i.e., vis-broken) polypropylene-based polymer described herein.

In some embodiments, the composition includes a first propylene-based polymer component and a second propylene-based polymer component having differing comonomer content wherein both the first propylene-based polymer component and the second propylene-based polymer component are random copolymers. In one or more embodiments, the second propylene-based polymer component has a comonomer content that is at least 1 mol %, 2 mol %, or at least 3 mol %, or at least 4 mol %, or at least 5 mol %, or at least 6 mol %, or at least 7 mol % or at least 8 mol %, or at least 9 mol %, or at least 10 mol % or at least 12 mol % greater than the comonomer content of the first propylene-based polymer component. In some embodiments, the second propylene-based polymer component has a comonomer content difference (i.e. delta) as compared to the first propylene-based polymer of less than 16 mol % delta, or less than 14 mol % delta, or less than 12 mol % delta, or less than 10 mol % delta, or less than 8 mol % delta.

In one embodiment, the at least two propylene-based polymers (e.g., first and second propylene-based copolymer component) comprise at least 20 wt %, at least 30 wt %, at least 40 wt %, at least 50 wt %, at least 60 wt %, at least 70 wt %, at least 80 wt %, and at least 90 wt % of the adhesive composition.

In other embodiments, the lower wt % limit of the at least two propylene-based polymer components may be 10 wt %, 20 wt %, 30 wt %, 40 wt %, 50 wt %, 60 wt %, 70 wt %, 80 wt %, and 90 wt %; and the upper wt % may be 20 wt %, 30 wt %, 40 wt %, 50 wt %, 60 wt %, 70 wt %, 80 wt %, 90 wt %, and 100 wt % with ranges from any lower limit to any upper limit being contemplated and wherein the wt % is based on the wt % of the adhesive composition.

In one embodiment, the first propylene-based polymer component comprises at least 10 wt %, at least 20 wt %, at least 30 wt %, at least 40 wt %, at least 50 wt %, at least 60 wt %, at least 70 wt %, and at least 80 wt % of the adhesive composition.

In other embodiments, the lower wt % limit of the first propylene-based polymer component may be 10 wt %, 20 wt %, 30 wt %, 40 wt %, 50 wt %, 60 wt %, 70 wt %, 80 wt %, and 90 wt %; and the upper wt % may be 20 wt %, 30 wt %, 40 wt %, 50 wt %, 60 wt %, 70 wt %, 80 wt %, and 90 wt % with ranges from any lower limit to any upper limit being contemplated and wherein the wt % is based on the wt % of the adhesive composition.

In one embodiment, the second propylene-based polymer component comprises at least 10 wt %, at least 20 wt %, at least 30 wt %, at least 40 wt %, at least 50 wt %, at least 60 wt %, at least 70 wt %, and at least 80 wt % of the adhesive composition.

In other embodiments, the lower wt % limit of the second propylene-based polymer component may be 10 wt %, 20 wt %, 30 wt %, 40 wt %, 50 wt %, 60 wt %, 70 wt %, 80 wt %, and 90 wt %; and the upper wt % may be 20 wt %, 30 wt %, 40 wt %, 50 wt %, 60 wt %, 70 wt %, 80 wt %, and 90 wt % with ranges from any lower limit to any upper limit being contemplated and wherein the wt % is based on the wt % of the adhesive composition.

In some embodiments, the adhesive composition comprises substantially equal parts by weight of the first propylene-based polymer component and the second propylene-based polymer component. In other embodiments, the adhesive composition comprises different amounts, by weight, of the first propylene-based polymer component and the second propylene-based polymer component. In other embodiments, the weight content ratio of the first propylene-based polymer component is greater than the weight content of the second propylene-based polymer component in the adhesive composition. In certain embodiments, the weight content ratio of the first propylene-based polymer component to second propylene-based polymer component is between 4:1 and 1:4. In some embodiments, the composition comprises a greater amount by weight of the more crystalline polymer. In certain embodiments, the weight content ratio of the more crystalline polymer to less crystalline polymer is greater than 3:1 in the adhesive composition. In one or more embodiments, the weight content ratio of the more crystalline polymer to less crystalline polymer is between about 3.5:1 to about 4:1.

In one embodiment, the adhesive composition comprising the first propylene-based polymer and the second propylene-based polymer has a set time of 6 seconds or less, 5 seconds or less, 4 seconds or less, 3 seconds or less, 2 seconds or less, and 1.5 seconds or less as measured by Dot Set Time (also referred to as set time). In another embodiment, the set time is greater than about 1 second, from about 1 second to about 3 seconds, or from about 1 second to about 2.5 seconds.

In one embodiment, the adhesive composition comprising the first propylene-based polymer component and the second propylene-based polymer component has a fiber tear of greater than 50%, greater than 60%, greater than 70%, greater than 80%, greater than 90%, or about 100%. In another embodiment, the fiber tear from about 50% to about 100%, or from about 80% to about 100%.

In one or more embodiments, the first propylene-based polymer component may include at least about 2 wt %, at least about 3 wt %, at least about 5 wt %, at least about 6 wt %, at least about 8 wt %, or at least about 10 wt % comonomer selected from the group consisting of ethylene, $C_4$ to $C_{20}$ alpha-olefin, and combination thereof. In another embodiment, the first propylene-based polymer component may include from about 0.01 wt % to about 10 wt %, from about 0.01 wt % to about 9 wt %, from about 0.01 wt % to about 8 wt %, from about 0.01 wt % to about 7 wt %, from about 0.01 wt % to about 6 wt %, from about 0.01 wt % to about 5 wt %, from about 0.01 wt % to about 4 wt %, from about 0.01 wt % to about 3 wt %, from about 0.01 wt % to about 2 wt %, and from about 0.01 wt % to about 1 wt % comonomer selected from the group consisting of ethylene, $C_4$ to $C_{20}$ alpha-olefin, and combination thereof.

In other embodiments, the lower wt % limit of the comonomer of the first propylene-based polymer component is 0.01 wt %, 1 wt %, 2 wt %, 3 wt %, 4 wt %, 5 wt %, 6 wt %, 7 wt %, 8 wt %, and 9 wt %; and the upper wt % may be 1 wt %, 2 wt %, 3 wt %, 4 wt %, 5 wt %, 6 wt %, 7 wt %, 8 wt %, and 9 wt % with ranges from any lower limit to any upper limit being contemplated and wherein the wt % is based on the first propylene-based polymer component and wherein the comonomer is selected from the group consisting of ethylene, $C_4$ to $C_{20}$ alpha-olefin, and combination thereof.

In one or more embodiments, the first propylene-based polymer component may include at least about 1 mol %, 2 mol %, 3 mol %, at least about 4 mol %, at least about 5 mol %, at least about 6 mol %, at least about 8 mol %, at least about 10 mol %, at least about 11 mol %, at least about 12 mol %, at least about 13 mol %, at least about 14 mol %, or at least about 15 mol %, comonomer selected from the group consisting of ethylene, $C_4$ to $C_{20}$ alpha-olefin, and combination thereof. In another embodiment, the first propylene-based polymer component may include from about 0.01 mol % to about 14 mol %, from about 0.01 mol % to about 13 mol %, from about 0.01 mol % to about 12 mol %, from about 0.01 mol % to about 11 mol %, from about 0.01 mol % to about 10 mol %, from about 0.01 mol % to about 9 mol %, from about 0.01 mol % to about 8 mol %, from about 0.01 mol % to about 7 mol %, from about 0.01 mol % to about 6 mol %, from about 0.01 mol % to about 5 mol %, from about 0.01 mol % to about 4 mol %, from about 0.01 mol % to about 3 mol %, and from about 0.01 mol % to about 2 mol % comonomer selected from the group consisting of ethylene, $C_4$ to $C_{20}$ alpha-olefin, and combination thereof.

In other embodiments, the lower mol % limit of the comonomer of the first propylene-based polymer component is 0.01 mol %, 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, and 14 mol %; and the upper wt % may be 2 mol %, 3 mol %, 4 mol %, 5 mol %, 6 mol %, 7 mol %, 8 mol %, 9 mol %, 10 mol %, 11 mol %, 12 mol %, 13 mol %, and 14 mol % with ranges from any lower limit to any upper limit being contemplated and wherein the mol % is based on the first propylene-based polymer component and wherein the comonomer is selected from the group consisting of ethylene, $C_4$ to $C_{20}$ alpha-olefin, and combination thereof.

In one or more embodiments, the second propylene-based polymer component may include at least about 2 wt %, at least about 3 wt %, at least about 5 wt %, at least about 6 wt %, at least about 8 wt %, or at least about 10 wt % comonomer selected from the group consisting of ethylene, $C_4$ to $C_{20}$ alpha-olefin, and combination thereof. In another embodiment, the second propylene-based polymer component may include from about 10 wt % to about 40 wt %, from about 11 wt % to about 40 wt %, from about 12 wt % to about 40 wt %, from about 13 wt % to about 40 wt %, from about 14 wt % to about 40 wt %, from about 15 wt % to about 40 wt %, from about 16 wt % to about 40 wt %, from about 17 wt % to about 40 wt %, from about 18 wt % to about 40 wt %, from about 19 wt % to about 40 wt %, and from about 20 wt % to about 40 wt % co-monomer.

In other embodiments, the lower wt % limit of the comonomer of the second propylene-based polymer component is 10 wt %, 11 wt %, 12 wt %, 13 wt %, 14 wt %, 15 wt %, 16 wt %, 17 wt %, 18 wt %, 19 wt % and 20 wt %; and the upper wt % may be 20 wt %, 25 wt %, 30 wt %, 35 wt %, 40 wt %, 45 wt %, and 50 wt % with ranges from any lower limit to any upper limit being contemplated and wherein the wt % is based on the second propylene-based polymer component and wherein the comonomer is selected from the group consisting of ethylene, $C_4$ to $C_{20}$ alpha-olefin, and combination thereof.

In one or more embodiments, the second propylene-based polymer component may include at least about 5 mol %, at least about 6 mol %, at least about 7 mol %, at least about 8 mol %, at least about 9 mol %, at least about 10 mol %, at least about 11 mol %, at least about 12 mol %, at least about 13 mol %, at least about 14 mol %, at least about 15 mol %, at least about 20 mol %, or at least about 25 mol % comonomer selected from the group consisting of ethylene, $C_4$ to $C_{20}$ alpha-olefin, and combination thereof. In another embodiment, the second propylene-based polymer component may include from about 14 mol wt % to about 40 mol %, from about 15 mol % to about 40 mol %, from about 16 mol % to about 40 mol %, from about 17 mol % to about 40 mol %, from about 18 wt % to about 40 mol %, from about 19 mol % to about 40 mol %, from about 20 mol % to about 40 mol %, from about 21 mol % to about 40 mol %, from about 22 mol % to about 40 mol %, from about 23 mol % to about 40 mol % co-monomer, from about 24 mol % to about 40 mol % co-monomer, and from about 25 mol % to about 40 mol % co-monomer.

In other embodiments, the lower mol % limit of the comonomer of the second propylene-based polymer component is 14 mol %, 15 mol %, 16 mol %, 17 mol %, 18 mol %, 19 mol %, 20 mol %, 21 mol %, 22 mol %, 23 mol %, 24 mol %, and 25 mol %; and the upper wt % may be 30 mol %, 35 mol %, 40 mol %, 45 mol %, and 50 mol % with ranges from any lower limit to any upper limit being contemplated and wherein the mol % is based on the second propylene-based polymer component and wherein the comonomer is selected from the group consisting of ethylene, $C_4$ to $C_{20}$ alpha-olefin, and combination thereof.

In one embodiment the first propylene-based polymer component has a viscosity (also referred to a Brookfield Viscosity or Melt Viscosity) of 90,000 mPa·sec or less at 190° C. (as measured by ASTM D 3236 at 190° C.); or 80,000 mPa·sec or less, or 70,000 mPa·sec or less, or 60,000 mPa·sec or less, or 50,000 mPa·sec or less, or 40,000 mPa·sec or less, or 30,000 mPa·sec or less, or 20,000 mPa·sec or less, or 10,000 mPa·sec or less, or 8,000 mPa·sec or less, or 5,000 mPa·sec or less, or 4,000 mPa·sec or less, or 3,000 mPa·sec or less, or 1,500 mPa·sec or less, or between 250 and 15,000 mPa·sec, or between 500 and 15,000 mPa·sec, or between 1,000 and 15,000 mPa·sec, or between 1,500 and 15,000 mPa·sec, or between 2,000 and 15,000 mPa·sec, or between 3,000 and 15,000 mPa·sec, or between 4,000 and 15,000 mPa·sec, or between 5,000 and 15,000 mPa·sec, or between 2,500 and 12,500 mPa·sec, or between 3,000 and 12,000 mPa·sec, or between 3,500 and 11,000 mPa·sec, or between 4,000 and 10,000 mPa·sec, or between 5,000 and 10,000 mPa·sec, or between 500 and 10,000 mPa·sec, or between 500 and 9,000 mPa·sec, or between 500 and 8,000 mPa·sec, or between 500 and 7,000 mPa·sec, or between 500 and 6,000 mPa·sec, or between 500 and 5,000 mPa·sec, or between 500 and 4,000 mPa·sec, or between 500 and 3,000 mPa·sec.

In another embodiment, the first propylene-based polymer component described above also have a viscosity (also referred to a Brookfield Viscosity or Melt Viscosity) of greater than 250 mPa·sec at 190° C. (as measured by ASTM D 3236 at 190° C.), or greater than 500 mPa·sec, or greater than 1,000 mPa·sec, or greater than 2,000 mPa·sec, or greater than 3,000 mPa·sec, or greater than 4,000 mPa·sec, or greater than 5,000 mPa·sec.

In one embodiment, the second propylene-based polymer component has a viscosity (also referred to a Brookfield Viscosity or Melt Viscosity) of 90,000 mPa·sec or less at 190° C. (as measured by ASTM D 3236 at 190° C.); or 80,000 or less, or 70,000 or less, or 60,000 or less, or 50,000 or less, or 40,000 or less, or 30,000 or less, or 20,000 or less, or 10,000 or less, or 8,000 or less, or 5000 or less, or 4000 or less, or 3000 or less, or 1500 or less, or between 250 and 15,000 mPa·sec, or between 500 and 15,000 mPa·sec, or between 1,000 and 15,000 mPa·sec, or between 1,500 and 15,000 mPa·sec, or between 2,000 and 15,000, or between 3,000 and 15,000, or between 4,000 and 15,000, or between 5,000 and 15,000, or between 2,500 and 12,500, or between 3,000 and 12,000, or between 3,500 and 11,000, or between 4,000 and 10,000, or between 5,000 and 10,000, or between 500 and 10,000 mPa·sec, or between 500 and 9,000 mPa·sec, or between 500 and 8,000 mPa·sec, or between 500 and 7,000 mPa·sec, or between 500 and 6,000 mPa·sec, or between 500 and 5,000 mPa·sec, or between 500 and 4,000 mPa·sec, or between 500 and 3,000 mPa·sec.

In another embodiment, the second propylene-based polymer component described above also have a viscosity (also referred to a Brookfield Viscosity or Melt Viscosity) of greater than 250 mPa·sec at 190° C. (as measured by ASTM D 3236 at 190° C.), or greater than 500 mPa·sec, or greater than 1,000 mPa·sec, or greater than 2,000 mPa·sec, or greater than 3,000 mPa·sec, or greater than 4,000 mPa·sec, or greater than 5,000 mPa·sec.

In one embodiment, the first propylene-based polymer component can have a weight average molecular weight (Mw) of from about 5,000 to about 1,000,000 g/mole, or from about 20,000 to about 500,000 g/mole, or from about 5,000 to about 400,000 g/mole, or from about 5,000 to about 200,000 g/mole, or from about 5,000 to about 100,000 g/mole, or from about 5,000 to about 75,000 g/mole, or from about 5, 000 to about 50,000 g/mole or from about 10,000 to about 50,000 g/mole, or from about 20,000 to about 50,000 g/mole, or from about 30,000 to about 50,000 g/mole, or from about 35,000 to about 50,000 g/mole.

In one embodiment, the second propylene-based polymer component can have a weight average molecular weight (Mw) of from about 5,000 to about 1,000,000 g/mole, or from about 20,000 to about 500,000 g/mole, or from about 5,000 to about 400,000 g/mole, or from about 5,000 to about 200,000 g/mole, or from about 5,000 to about 100,000 g/mole, or from about 5,000 to about 75,000 g/mole, or from about 5, 000 to about 50,000 g/mole or from about 10,000 to about 50,000 g/mole, or from about 20,000 to about 50,000 g/mole, or from about 30,000 to about 50,000 g/mole, or from about 35,000 to about 50,000 g/mole.

In some embodiments, the composition includes a first propylene-based polymer and a second propylene-based polymer that have different heats of fusion. In some embodiments, the difference in heat of fusion between the first propylene-based polymer and the second propylene-based polymer is at least 5 J/g, or at least 10 J/g, or at least 15 J/g, or at least 20 J/g, or at least 25 J/g, or at least 30 J/g, or at least 35 J/g, or at least 40 J/g or at least 50 J/g. For example, the second propylene-based polymer may have a heat of fusion that is at least 5 J/g less, or at least 10 J/g less, or at least 15 J/g less, or at least 20 J/g less, or at least 25 J/g less, or at least 30 J/g, or at least 35 J/g less, or at least 40 J/g less, or at least 50 J/g less than the heat of fusion of the first propylene-based polymer. Or put another way, the first propylene-based polymer may have a heat of fusion that is at least 5 J/g greater, or at least 10 J/g greater, or at least 15 J/g greater, or at least 20 J/g greater, or at least 25 J/g greater, or at least 30 J/g greater, or at least 35 J/g greater, or at least 40 J/g, or at least 50 J/g greater than the second propylene-based polymer.

In one embodiment, the first propylene-based copolymer component has a heat of fusion as determined by differential scanning calorimetry (DSC) between about 1 and about 120 (J/g), between about 1 and about 100 (J/g), for example between about 1 and about 75 (J/g), such as between about 1 and about 70 J/g, such as between about 1 to 60 J/g, such as between about 2 to about 50 J/g, such as between about 2 and about 40 J/g. In another embodiment, the first propylene-based copolymer has a heat of fusion of greater than 120 J/g, 95 J/g, greater than 90 J/g, greater than 85 J/g, greater than 80 J/g, greater than 75 J/g, greater than 70 J/g, greater than 65 J/g, greater than 60 J/g, greater than 50 J/g, greater than 40 J/g, greater than 30 J/g, greater than 25 J/g, greater than 20 J/g, and greater than about 10 J/g.

In other embodiments, the lower heat of fusion limit of the first propylene-based polymer may be 1 J/g, 10 J/g, 15 J/g, 20 J/g, 25 J/g, 30 J/g, 35 J/g, 40 J/g, 45 J/g, 50 J/g, 55 J/g, 60 J/g, 65 J/g, 70 J/g, 75 J/g, 80 J/g, 85 J/g, and 90 J/g; and the upper heat of fusion limit may be 20 J/g, 30 J/g, 40 J/g, 50 J/g, 60 J/g, 65 J/g, 70 J/g, 75 J/g, 80 J/g, 85 J/g, 90 J/g, 95 J/g, 100 J/g, and 120 J/g with ranges from any lower limit to any upper limit being contemplated and wherein the wt % is based on the wt % of the adhesive composition.

In one embodiment, the first propylene-based copolymer component typically has a melting point of greater than 90° C., or greater than 100° C., or greater than 110° C. In another embodiment, the first propylene-based copolymer component has a melting point of less than 130° C., less than 120° C., less than 110° C., less than 100° C., and less than 90° C.

In one embodiment, the second propylene-based copolymer component has a heat of fusion as determined by differential scanning calorimetry (DSC) between about 1 and about 100 J/g, for example between about 1 and about 90 J/g, such as from about 1 to 80 J/g, such as from about 2 to about 70 J/g, such as between about 2 and about 60 J/g, such as between 2 and 50 J/g. In another embodiment, the second propylene-based copolymer has a heat of fusion of less than 75 J/g, less than 70 J/g, less than 65 J/g, less than 60 J/g, less than 50 J/g, less than 40 J/g, less than 30 J/g, less than 25 J/g, less than 20 J/g, and less than about 10 J/g.

In other embodiments, the lower heat of fusion limit of the second propylene-based polymer may be 1 J/g, 5 J/g, 10 J/g, 15 J/g, 20 J/g, 25 J/g, 30 J/g, 35 J/g, 40 J/g, 45 J/g, 50 J/g, 55 J/g, 60 J/g, 65 J/g, 70 J/g, 75 J/g, 80 J/g and 90 J/g; and the upper heat of fusion limit may be 20 J/g, 25 J/g, 30 J/g, 35 J/g, 40 J/g, 45 J/ g, 50 J/g, 55 J, g, 60 J/g, 65 J/g, 70 J/g, 75 J/g, 80 J/g. 80 J/g, and 100 J/g with ranges from any lower limit to any upper limit being contemplated and wherein the wt % is based on the wt % of the adhesive composition.

In one embodiment, the second propylene-based copolymer component typically has a melting point of greater than 10° C., or greater than 20° C., or greater than 30° C. In another embodiment, the first propylene-based copolymer component has a melting point of less than 130° C., less than 120° C., less than 110° C., less than 100° C., less than 90° C., less than 80° C., less than 70° C., less than 60° C., less than 50° C., and less than 40° C.

Functional Component

By "functionalized component" is meant that the component (e.g., polymer) is contacted with a functional group, and optionally a catalyst, heat, initiator, or free radical source to cause all or part of the functional group to incorporate, graft, bond to, physically attach to, and/or chemically attach to the polymer.

The adhesive composition may comprise one or more additives including functional components. In this section we discuss these functional components in further detail. Typically, the component to be functionalized is combined with a free radical initiator and a grafting monomer or other functional group (such as maleic acid or maleic anhydride) and is heated to react the monomer with the polymer, copolymer, oligomer, etc., to form the functionalized component. Multiple methods exist in the art for functionalizing polymers that may be used with the polymers described here. These include selective oxidation, free radical grafting, ozonolysis, epoxidation, and the like.

Examples of suitable functionalized components for use in this invention include, but are not limited to, functionalized olefin polymers, (such as functionalized C2-C40 homopolymers, functionalized C2-C40 copolymers, functionalized higher Mw waxes), functionalized oligomers, (such as functionalized low Mw waxes, functionalized tackifiers), beta nucleating agents and combinations thereof.

Useful functionalized olefin polymers and copolymers useful in this invention include maleated polyethylene, maleated metallocene polyethylene, maleated metallocene polypropylene, maleated ethylene propylene rubber, maleated polypropylene, maleated ethylene copolymers, functionalized polyisobutylene (typically functionalized with maleic anhydride typically to form a succinic anhydride), and the like.

Preferred functionalized waxes useful as functionalized components herein include those modified with an alcohol, an acid, a ketone, an anhydride and the like. Preferred examples include waxes modified by methyl ketone, maleic anhydride or maleic acid. Preferred functionalized waxes useful herein include maleated polypropylene was available from Chusei under the tradename MAPP 40, maleated metallocene waxes (such as TP LICOCENE PP1602 available from Clariant, in Augsburg, Germany); maleated polyethylene waxes and maleted polypropylene waxes available from Eastman Chemical in Kingsport Tenn. under the trade names EPOLENE C-16, EPOLENE C-18, EPOLENE E43, EPOLENE G-3003; maleated polypropylene wax LICOMONT AR 504 availabe from Clariant; grafted functional polymers available from Dow Chemical Co., under the tradenames AMPLIFY EA 100, AMPLIFY EA 102, AMPLIFY 103, AMPLIFY GR 202, AMPLIFY GR 205, AMPLIFYGR 207, AMPLIFY GR 208, AMPLIFY GR 209, AMPLIFY VA 200; CERAMER maleated ethylene polymers available from Baker Hughes under the tradenames CERAMER 1608, CERAMER 1251, CERAMER 67, CERAMER 24; and ethylene methyl acrylate co and terpolymers.

Useful waxes include polypropylene waxes having an Mw weight of 15,000 of less, preferably from 3,000 to 10,000 and a crystallinity of 5% or more, preferably 10 wt % or more having a functional group content (preferably maleic anhydride) of up to 10 wt %.

Additional preferred functionalized polymers for use as functional components herein include A-C X596A, A-C X596P, A-C X597A, A-C X597P, A-C X950P, A-C X1221, A-C 395A, A-C 395A, A-C 1302P, A-C 540, A-C 54A, A-C 629, A-C 629A, A-C 307, and A-C 307A available from Honeywell.

UNILIN long chain alcohols, available from Baker Hughes are also useful as functionalized components herein, particularly UNILIN 350, UNILIN 425, UNILIN 550, and UNILIN 700.

UNICID linear, primary carboxylic acids, available from Baker Hughes are also useful as functionalized components herein, particularly UNICID 350, UNICID 425, UNICID 550, and UNICID 700.

Preferred functionalized hydrocarbon resins that may be used as functionalized components in this invention include those described in WO 03/025084; WO 03/025037; WO 03/025036; and EP 1 295 926 A1; which are incorporated by reference herein.

In a preferred embodiment a hydrocarbon resin is functionalized with an unsaturated acids or anhydrides containing at least one double bond and at least one carbonyl group and used as the functionalized component of this invention. Preferred hydrocarbon resins that can be functionalized are listed below as tackifiers. Representative acids include carboxylic acids, anhydrides, esters and their salts, both metallic and non-metallic. Preferably the organic compound contains an ethylenic unsaturation conjugated with a carbonyl group (—C═O). Examples include maleic, fumaric, acrylic, methacrylic, itaconic, crotonic, alpha.methyl crotonic, and cinnamic acids as well as their anhydrides, esters and salt derivatives. Particularly preferred functional groups include maleic acid and maleic anhydride. Maleic anhydride is particularly preferred. The unsaturated acid or anhydride is preferably present at about 0.1 wt % to about 10 wt %, preferably at about 0.5 wt % to about 7 wt %, even more preferably at about 1 to about 4 weight %, based upon the weight of the hydrocarbon resin and the unsaturated acid or anhydride. In a preferred embodiment the unsaturated acid or anhydried comprises a carboxylic acid or a derivative thereof selected from the group consisting of unsaturated carboxylic acids, unsaturated carboxylic acid derivatives selected from esters, imides, amides, anhydrides and cyclic acid anhydrides or mixtures thereof.

In a preferred embodiment the functionalized component is present at 0.005 wt % to 99 wt %, preferably 0.01 wt % to 99 wt %, preferably 0.05 wt % to 90 wt %, preferably between 0.1 wt % and 75 wt %, more preferably between 0.5 wt % and 60 wt %, more preferably between lw t% and 50 wt %, more preferably between 1.5 wt % and 40 wt %, more preferably between 2 wt % and 30 wt %, more preferably between 2 wt % and 20 wt %, more preferably between 2 wt % and 15 wt %, more preferably between 2 wt % and 10 wt %, more preferably between 2 wt % and 5 wt %, based upon the weight of the blend. Preferably the functionalized component is present at 0.005 wt % to 10 wt %, more preferably 0.01 wt % to 10 wt %, based upon the weight of the blend.

In other embodiments, the functionalized component is present at from 0.01 wt % to 5 wt %, preferably from 0.01 wt % to 4 wt %, preferably from 0.01 wt % to 3 wt %, preferably from 0.01 wt % to 2 wt %, preferably from 0.01 wt % to 1 wt %, preferably from 0.01 wt % to 0.5 wt % or less, preferably from 0.01 wt % to 0.1 wt %, based upon the weight of the adhesive composition. In some preferred embodiments, the functionalized component is present in an amount of from 1 wt % to 5 wt %, from 1 wt % to 4 wt %, or from 2.0 wt % to 4.0 wt %. In some preferred embodiments, a functionalized component is not present in the adhesive.

Block Copolymer Component

The adhesive compositions described herein may comprise a block copolymer component such as a styrenic block copolymer. The phrase "block copolymer" is intended to include any manner of block copolymer having two or more polymer chains attached at their ends, including but not limited to diblock, triblock, and tetrablock copolymers. "Block copolymer" is further meant to include copolymers having any structure known to those of skill in the art, including but not limited to linear, radial or multi-arm star, multi-branched block copolymers, and random block copolymers. "Linear block copolymers" comprise two or more polymer chains in sequence. "Radial block copolymers" (or "star block copolymers") comprise more than two linear block copolymers attached at a common branch point. "Styrenic block copolymers" comprise a block copolymer having at least one block that is substantially styrene. While the block copolymers may be linear or radial, combinations of linear and radial block copolymers are particularly useful. The block copolymers may or may not be hydrogenated.

A linear diblock copolymer would traditionally have the formula (A-B) wherein A is substantially a vinyl aromatic block and B is substantially a polydiene block. The polydiene in the B block may be a conjugated diene block or the B block may be a combination of conjugated dienes such as polyisoprene and polybutadiene either in block or random order.

A linear diblock (A-B) may also include a random block copolymer wherein the B block may include styrene randomly inserted into the B block in addition to the one or more dienes. Examples of such random block copolymers having styrene included in the B block include Solprene™ 1205 (a linear random-block styrene-butadiene copolymer having a 25% bound styrene content, 17.5% present as a polystyrene block, and a specific gravity of 0.93) available from Dynasol Elastomeros S.A. de C.V. of Mexico.

The vinyl aromatic block may be derived from styrene, alpha-methylstyrene, p-methylstyrene, o-methylstyrene, p-tert-butylstyrene, 2,4-dimethylstyrene, diphenylethylenes including stilbene, vinyl naphthalene, vinyltoluene (a mixture of meta- and para-isomers of methylstyrene), vinylxylene, and combinations thereof. Of these vinyl aromatic monomers, styrene is preferred, although the vinyl aromatic block may comprise styrene and less than 5 wt % of the other vinyl aromatic monomers previously mentioned.

A linear styrene-diene-styrene triblock copolymer would traditionally have the formula (A-B-A) wherein A is substantially a vinyl aromatic block and B is substantially a polydiene block. The polydiene in the B block may be a conjugated diene block or the B block may be a combination of conjugated dienes such as polyisoprene and polybutadiene either in block or random order. In another embodiment, the B block may also include styrene randomly inserted into the B block in addition to the one or more dienes to form a random block copolymer.

Suitable block copolymers include linear block copolymers of styrene and one or more conjugated dienes such as SI (styrene-isoprene), SIS (styrene-isoprene-styrene), SB (styrene-butadiene), SBS (styrene-butadiene-styrene), SIB (styrene-isoprene-butadiene), or combination thereof.

Block copolymers comprising tetrablock or pentablock copolymers selected from A-B-A-B tetrablock copolymers or A-B-A-B-A pentablock copolymers and the like are also suitable such as SISI (styrene-isoprene-styrene-isoprene), SISB, SBSB, SBSI, SIBS, ISISI, ISISB, BSISB, ISBSI, BSBSB, and BSBSI block copolymers.

In one or more embodiments, the linear block copolymer includes a linear polymer of the formula S-I-S or S-B-S wherein S is substantially a polystyrene block, I is substantially a polyisoprene block, and B is substantially a polybutadiene block. The styrene content of the SBS block copolymer is typically from about 10 wt % to about 45 wt %, or from about 15 wt % to about 35 wt %, or from about 20 wt % to 30 wt %. The SIS block copolymers may be prepared by well known anionic solution polymerization techniques using lithium-type initiators such as disclosed in U.S. Pat. Nos. 3,251,905 and 3,239,478, which are hereby incorporated by reference in their entireties. The SIS and the SBS copolymer may be a pure triblock (one having less than 0.1 wt % of diblock polymer, preferably 0% diblock polymer), or may contain from about 0.1 to about 85 wt %, or from about 0.1 wt % to about 75 wt %, or from about 1 wt % to about 65 wt %, or from about 5 wt % to about 50 wt %, or from 5 wt % to 25 wt %, or from 10 wt % to 20 wt % diblock copolymer having the structure S-I or SB, respectively. The SI or SB diblock may be present as a residue from the manufacture of the triblock copolymer or may be separately blended with the triblock as a further technique for achieving target polystyrene content or modifying the cohesive properties of the composition. In one or more embodiments, the number average molecular weight of the diblock SI copolymers may range from about 25,000 g/mol to about 250,000 g/mol.

The SBS or SIS linear block copolymers employed herein may have a number average molecular weight (Mn) (determined by GPC) in the range of from about 50,000 to 500,000 g/mol, or from about 100,000 to about 180,000 g/mol, or from about 110,000 to about 160,000 g/mol, or from about 110,000 to about 140,000 g/mol.

Linear SBS and SIS block copolymers of the type described herein are available commercially and are prepared in accordance with methods known in the art. Examples of SBS and SIS copolymers useful in the practice of this invention include those available under the trade names Vector (from Dexco Polymers LLP), Kraton (from Kraton Polymers LLC), Europrene (from Polimeri), and Finaprene (from Total PetroChemicals). Particularly useful triblock copolymers include, but are not limited to, Vector™ 4111A, 4113A, 4114A, 4211A, 4215A, 4411A, 2518A, 2518P, 4461, 6241, 7400, and 8508A; Kraton D 1102, D 4141, D 4158, Europrene SOL T 166, and Finaprene 411. In one or more embodiments, the SIS block copolymers used in this invention may have a melt flow rate in the range of from about 5 to 40 g/10 min., as measured by ASTM D 1238 using condition G (200° C., 5 kg weight).

In one or more embodiments, the block copolymer component may be a radial block copolymer. A radial block copolymer would traditionally have the notation $(A-B)_nX$ wherein A is substantially a vinyl aromatic block such as styrene, B is substantially a polydiene block, X is the residue of a multifunctional coupling agent used in the production of the radial block copolymer, and n is an integer of from about 2 to about 10, from 3 to 8, from 3 to 7, from 4 to 6, or 4. In the same or other embodiments, the radial block copolymer component may have a linear block copolymer content of from about 0 wt % to about 85 wt % such as a diblock copolymer. Linear block content may be determined by GPC, and may be manipulated via the reactor settings employed to produce the block copolymer component. Linear block content may also be adjusted after production by blending an additional quantity of linear block material into the block copolymer component. Linear block content in the radial block copolymer may be from 5 wt % to 90 wt %, 15 wt % to about 90 wt %, or from about 20 wt % to about 85 wt %, or from about 25 wt % to about 80 wt %.

The production of radial block copolymers often results in an amount of block copolymer which is linear in structure, along with the radial structure. Also, a linear block copolymer may be added to the radial block copolymer to modify the properties of the block copolymer. These block copolymers may be referred to in terms of their linear block content such as a diblock content, wherein the linear block content (expressed as a weight percentage) refers to the amount of copolymer which is linear in structure. The remaining portion of the block copolymer not included in the linear block percentage is therefore radial in structure. Accordingly, the radial block copolymer $(A-B)_n$ will typically comprise a linear component (A-B) wherein A is substantially a vinyl aromatic block and B is substantially a polydiene block. A typical notation for such a radial/linear combination is $(A-B)_n/A-B$. The vinyl aromatic content (e.g. styrene) of the $(A-B)_n$ block copolymer or the $(A-B)_n/A-B$ block copolymer composition is typically from about 10 wt % to about 45 wt %, or from about 15 wt % to about 35 wt %, or from about 17 wt % to 22 wt %.

Suitable block copolymer compositions comprising radial and linear block copolymers such as $(SI)_n/(SI)$ may have a diblock content of from about 15 wt % to about 90 wt %, or from about 20 wt % to about 85 wt %, or from about 25 wt % to about 80 wt %. Other suitable block copolymers include $(SB)_n/(SB)$ which may have a diblock content of from about 5 wt % to about 90 wt %, or from about 5 wt % to about 50 wt %, or from about 5 wt % to about 25 wt %, or from about 5 wt % to about 15 wt %.

These radial block copolymers are multi-armed, and may have, for example, three, four, five, or more arms extending from a central point in a radial fashion, wherein one end of each arm is connected to the other arms at the center of the copolymer structure via a coupling agent or coupling group. Coupling agents are well known in the art, and any suitable multifunctional coupling agent may be used to form the radial block copolymers described herein. Suitable coupling agents may include, for example, silanes, liquid and metallic multifunctional acrylates and methacrylates, divinylbenzene, functionalized polybutadiene resins, functionalized cyanurate, allyl isocyanurate, and diesters.

In some embodiments, the radial block copolymer component is a styrenic block copolymer chosen from a styrene-isoprene $(SI)_n$ block copolymer or a styrene-butadiene $(SB)_n$ block copolymer. In other embodiments, the radial block copolymer may comprise a mixture of a radial and linear block copolymer such as $(SI)_n/(SI)$ or $(SB)_n/(SB)$.

The radial $(A-B)_n$ or $(A-B)_n/A-B$ block copolymers employed herein may have a number average molecular weight (Mn) (determined by GPC) in the range of from about 50,000 to 500,000 g/mol, or from about 70,000 to about 250,000 g/mol, or from about 90,000 to about 175,000 g/mol, or from about 90,000 to about 135,000 g/mol. Specifically, radial SI or SB copolymers useful in the practice of the invention may have a molecular weight (Mn) of from about 180,000 to about 250,000 g/mol.

The radial block copolymers or radial and linear block copolymer compositions useful for the present invention may additionally have a melt flow rate (MFR) (200° C., 5 kg) from about 5 to about 35 g/10 min, or from about 10 to about 30 g/10 min, or from about 12 to about 25 g/10 min. Further, the copolymers may have a specific gravity from about 0.90 to about 0.97, or from about 0.92 to about 0.95; a molecular weight (Mn) from about 25,000 to about 300,000 g/mol, or from about 150,000 to about 275,000 g/mol, or from about 175,000 to about 250,000 g/mol; and/or a Shore A hardness (ASTM D 2240) from about 35 to about 55, or from about 40 to about 50. Suitable radial block copolymer compositions with linear block copolymer such as $(SI)_n/(SI)$ include, but are not limited to, those available under the trade names Vector 4230 and Vector 4186A from Dexco Polymers LLP. Suitable radial block copolymer compositions with linear block copolymer such as $(SB)_n/(SB)$ include, but are not limited to, those available under the trade names Vector 2411 and 2411P from Dexco Polymers LLP.

In other embodiments, radial styrenic triblock copolymers and other styrenic block copolymers suitable for use in the present invention include those described in U.S. Application Pub. No. 2009/0133834, which is incorporated by reference herein in its entirety.

The radial or linear A-B block copolymers may comprise a blend of two or more different A-B copolymers, which may have the same or different styrene content, and may be blended to a ratio in the range of from 10:1 to 1:10 parts by weight. The use of two different A-B block copolymers may offer improved cohesive strength and allow more precise tailoring of the polystyrene content.

In another embodiment, the B block (diene block) may be hydrogenated. For example, hydrogenating the B block (diene block) of an A-B diblock or an A-B-A triblock may produce a B block comprising at least one olefin wherein the olefin is chosen from ethylene, propylene, and butylene. Suitable block copolymers are the Kraton™ G Series polymers including SEP (styrene-ethylene-propylene), SEBS (styrene-ethylene-butylene-styrene) and SEPS (styrene-ethylene-propylene-styrene). Examples of the Kraton™ G series that are commercially available include Kraton™ G1702H (diblock) and Kraton™ A1535H (triblock).

In one or more embodiments, the adhesive compositions described herein may comprise from about 25 to about 65 wt %, or from about 30 to about 60 wt %, or from about 35 to about 55 wt % of the block copolymer component.

Ester Copolymer Component

In one embodiment, the adhesive composition comprises an ester copolymer component comprising at least one olefin and at least one copolymerizable ester. An example of such an ester copolymer is ethylene vinyl acetate copolymer.

In one embodiment, the olefins are selected from ethylene, propylene, butylenes, and so on. In one embodiment, the olefin comprises ethylene. In one embodiment, the ester copolymers comprise one or more polar monomers, such as vinyl acetate or other vinyl esters of monocarboxylic acids or acrylic or methacrylic acid or their esters with methanol, ethanol, or other alcohols. Specific representative copolymers can include ethylene vinyl acetate, ethylene methyl acrylate, ethylene n-butyl acrylate, ethylene acrylic acid, ethylene 2-ethylhexyl acrylate, ethylene methacrylate, and mixtures and blends thereof. Ethylene n-butyl acrylate and ethylene vinyl acetate, as well as mixtures thereof, are particularly preferred. Random and block copolymers, as well as mixtures thereof, may be used in an embodiment.

The ester copolymer, in various embodiments, has a peak melting point greater than 50° C., greater than 60° C., greater than 70° C., greater than 80° C., greater than 90° C., greater than 95° C., greater than 100° C., or greater than 105° C. In an additional or alternative embodiment, the first copolymer can have a melt index from about 10 to about 1000 g/10 minutes. As used herein, melt index is determined at 190° C./2.16 kg in accordance with ASTM D1238. In an additional or alternative embodiment, the first copolymer can have a melt viscosity at 190° C. of at least 1000 mPa·sec, preferably at least 2000 mPa·sec. As used herein, melt viscosity is determined at 190° C. in accordance with ASTM D3236, unless otherwise indicated.

In an embodiment, the ester copolymer can have a copolymerizable ester comonomer content from about 5 wt % to about 50 wt % of the first copolymer, preferably from about 10 wt % to about 40 wt % of the first copolymer. In one embodiment, the first copolymer is an ethylene-vinyl acetate copolymer (EVA) having a vinyl acetate (VA) content from 10 wt % to 40 wt % of the first copolymer; and in another embodiment, an ethylene-n-butyl acrylate copolymer (EnBA) having an n-butyl acrylate (nBA) content from 25 wt % to 40 wt % by weight of the first copolymer.

EVA resins are commercially available under the trade designation ESCORENE, e.g., ESCORENE ULTRA MV 02514 EVA (14 wt % vinyl acetate). EnBA resins are commercially available under the trade designations EN, e.g., EXXONMOBIL EnBA EN 33330 EnBA (33 wt % EnBA, MI 330) and EXXONMOBIL EnBA EN 33900 EnBA (33 wt % EnBA, MI 900).

Tackifier Resin Component

In one or more embodiments of the present invention, the adhesive compositions described herein comprise a tackifier resin component, which may in turn comprise one or more hydrocarbon tackifier resins described herein.

In general, the tackifier resin component includes amorphous materials that can be added to an adhesive composition to achieve modification of adhesive characteristics. The tackifier resin component can be a low molecular weight natural or synthetic resin which is compatible with the polyolefins) and which provide the desired enhancement of film properties. Natural resins are defined as resins of plant or animal origin which include but are not limited to rosins such as gum, wood, or tall oil rosins. Synthetic resins are defined as resins resulting from controlled chemical reactions, such as hydrocarbon resins. Examples of hydrocarbon resins include coal tar resins, petroleum resins, and turpentine resins.

Examples of suitable tackifier resin components, include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, phenolic resins, hydrogenated terpenes and modified terpenes, hydrogenated rosin acids, and hydrogenated rosin esters. In some embodiments the tackifier is hydrogenated.

In other embodiments, the tackifier is non-polar, by which is meant that the tackifier is substantially free of monomers having polar groups. Preferably the polar groups are not present, however if present, they comprise not more than 5 weight %, preferably not more than 2 weight %, even more preferably no more than 0.5 weight %, of the tackifier. In some embodiments the tackifier has a softening point (Ring and Ball, as measured by ASTM E-28) of 80° C. to 150° C., preferably 100° C. to 130° C. In another embodiment the resin is liquid and has a R and B softening point of between 10 and 70° C.

The tackifier, if present, is typically present in an amount of at least about 1 wt %, at least about 10 wt %, at least about 20 wt %, at least 30 wt %, at least 40 wt %, at least 50 wt %, and at least 60 wt %, and at least 70 wt %.

Preferred hydrocarbon tackifier resins for use as tackifiers or modifiers include:

(a) Resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof. Additional preferred resins include those described in WO 91/07472; and U.S. Pat. Nos. 5,571,867, 5,171,793 and 4,078,132. Typically these resins are obtained from the cationic polymerization of compositions containing one or more of the following monomers: C5 diolefins (such as 1-3 pentadiene, isoprene, etc); C5 olefins (such as 2-methylbutenes, cyclopentene, etc.); C6 olefins (such as hexene), C9 vinylaromatics (such as styrene, alpha methyl styrene, vinyltoluene, indene, methyl indene, etc.); cyclics (such as dicyclopentadiene, methyldicyclopentadiene, etc.); and/or terpenes (such as limonene, carene, etc); and (b) Resins obtained by the thermal polymerization of dicyclopentadiene, and/or the thermal polymerization of dimers or oligomers of cyclopentadiene and/or methylcyclopentadiene, optionally with vinylaromatics (such as styrene, alpha-methyl styrene, vinyl toluene, indene, methyl indene).

In one embodiment, the tackifier resin component may comprise one or more hydrocarbon resins produced by the thermal polymerization of cyclopentadiene (CPD) or substituted CPD, which may further include aliphatic or aromatic monomers as described later. The hydrocarbon resin may be a non-aromatic resin or an aromatic resin. The hydrocarbon resin may have an aromatic content between 0% and 60%, preferably between 1% and 60%, or between 1% and 40%, or between 1% and 20%, or between 10% and 20%. In further embodiments, the hydrocarbon resin may have an aromatic content between 15% and 20%, or between 1% and 10%, or between 5% and 10%.

In another embodiment, the tackifier resin component may comprise hydrocarbon resins produced by the catalytic (cationic) polymerization of linear dienes. Such monomers are primarily derived from Steam Cracked Naptha (SCN) and include $C_5$ dienes such as piperylene (also known as 1,3-pentadiene). Polymerizable aromatic monomers can also be used to produce resins and may be relatively pure, e.g., styrene, -methyl styrene, or from a $C_9$-aromatic SCN stream. Such aromatic monomers can be used alone or in combination with the linear dienes previously described. "Natural" monomers can also be used to produce resins, e.g., terpenes such as α-pinene or β-carene, either used alone or in high or low concentrations with other polymerizable monomers. Typical catalysts used to make these resins are $AlCl_3$ and $BF_3$, either alone or complexed. Mono-olefin modifiers such as 2-methyl, 2-butene may also be used to control the molecular weight distribution (MWD) of the final resin. The final resin may be partially or totally hydrogenated as described in further detail below.

As used herein, aromatic content and olefin content are measured by $^1$H-NMR, as measured directly from the $^1$H NMR spectrum from a spectrometer with a field strength greater than 300 MHz, preferably 400 MHz. Aromatic content is the integration of aromatic protons versus the total number of protons. Olefin proton or olefinic proton content is the integration of olefinic protons versus the total number of protons.

In one or more embodiments, the tackifier resin component may be at least partially hydrogenated or substantially hydrogenated. As used herein, "at least partially hydrogenated" means that the material contains less than 90% olefinic protons, or less than 75% olefinic protons, or less than 50% olefinic protons, or less than 40% olefinic protons, or less than 25% olefinic protons. As used herein, "substantially hydrogenated" means that the material contains less than 5% olefinic protons, or less than 4% olefinic protons, or less than 3% olefinic protons, or less than 2% olefinic protons. The degree of hydrogenation is typically conducted so as to minimize and preferably avoid hydrogenation of the aromatic bonds.

In one or more embodiments, tackifier resin components described herein may be uniquely characterized as totally or substantially amorphous in nature. This means that a glass transition temperature ($T_g$) is detectable, e.g., by Differential Scanning calorimetry (DSC) but they have no melting point ($T_m$). To characterize these resins, it is generally accepted to use a test that roughly correlates with $T_g$, such as softening point (SP), which provides approximate, but not exact, values. The softening point (SP) of the resins is measured by a ring-and-ball softening point test according to ASTM E-28.

In some embodiments, the tackifiers may have a softening point of from about 50° C. to about 140° C., or from about 60° C. to about 130° C., or from about 70° C. to about 120° C., or from about 80° C. to about 110° C.

Typically, in one or more embodiments of the invention, the tackifier resin component has a number average molecular weight (Mn) from about 400 to about 3000, a weight average molecular weight (Mw) from about 500 to about 6000, a z-average molecular weight (Mz) from about 700 to about 15,000 and a polydispersity (PD), defined as Mw/Mn, between about 1.5 and about 4. As used herein, molecular weights (number average molecular weight (Mn), weight average molecular weight (Mw), and z-average molecular weight (Mz)) are measured by size exclusion chromatography using a Waters 150 Gel Permeation Chromatograph equipped with a differential refractive index detector and calibrated using polystyrene standards. Samples are run in tetrahydrofuran (THF) (45° C.). Molecular weights are reported as polystyrene-equivalent molecular weights and are generally measured in g/mol.

In one or more embodiments of the invention, the tackifier resin component may comprise one or more oligomers such as dimers, trimers, tetramers, pentamers, and hexamers. The oligomers may be derived from a petroleum distillate boiling in the range of 30° C.-210° C. The oligomers may be derived from any suitable process and are often derived as a byproduct of resin polymerization. Suitable oligomer streams may have molecular weights (Mn) between 130 and 500 g/mol, more preferably between 130 to 410 g/mol, more preferably between 130 and 350 g/mol, or between 130 and 270 g/mol, or between 200 and 350 g/mol, or between 200 and 320 g/mol. Examples of suitable oligomer streams include, but are not limited to, oligomers of cyclopentadiene and substituted cyclopentadiene, oligomers of $C_4$-$C_6$ conjugated diolefins, oligomers of $C_8$-$C_{10}$ aromatic olefins, and combinations thereof. Other monomers may be present. These include $C_4$-$C_6$ mono-olefins and terpenes. The oligomers may comprise one or more aromatic monomers and may be at least partially hydrogenated or substantially hydrogenated.

In one embodiment, the oligomers may be stripped from the resin before hydrogenation. The oligomers may also be hydrogenated with the resin and then stripped from the resin, yielding a hydrogenated resin and hydrogenated oligomers. In another embodiment, at least some of the oligomers are stripped before hydrogenation and at least some hydrogenated oligomers are stripped after hydrogenation. In yet another embodiment, the hydrogenated resin/oligomers product may be further processed together as a single mixture as described below. In yet another embodiment, the oligomers can be derived from any suitable source and hydrogenated (if necessary) before grafting so that the oligomers before grafting are typically at least partially hydrogenated and preferably substantially hydrogenated.

Examples of commercially available tackifiers include, but are not limited to, Escorez 2203LC, Escorez 1310LC, Escorez 1304, Escorez 5380, Escorez 5400, and Escorez 5600, manufactured by ExxonMobil Chemical Company; Piccotac 1905 and Eastotac H-100, manufactured by Eastman Chemicals; Quintone D and Quintone U 185, manufactured by Nippon Zeon; Marukares R100, manufactured by Maruzen; and Wingtack Extra and Wingtack Plus, manufactured by Cray Valley. Escorez 2101, Escorez 5690, and Escorez 2173, manufactured by ExxonMobil Chemical Company; Regalrez 5095, Regalrez 3102, Staybelite Ester 3, and Pentalyn H, manufactured by Eastman Chemicals; Quintone U 190, manufactured by Nippon Zeon; Wingtack 86, manufactured by Cray Valley; and Sylvalite RE 885 and Sylvatac RE 85, available from Arizona Chemical.

In one or more embodiments, the adhesive compositions described herein may comprise from about 5 wt % to about 50 wt %, or from about 10 wt % to about 40 wt %, or from about 15 wt % to about 35 wt % of the tackifier resin component.

Process Oil Component

In one or more embodiments of the present invention, one or more process oils may be added to the adhesive compositions described herein. As used herein, the term "process oil" means both petroleum derived process oils and synthetic plasticizers.

Examples of process oils suitable for use in the present invention include, but are not limited to, paraffinic or naphthenic oils such as Primol 352 or Sentinel PO 876, produced by ExxonMobil Chemical France; and Nyflex 222B, available from Nynas AB.

Further process oils suitable for use in the present invention include aliphatic naphthenic oils, white oils, and the like. Exemplary plasticizers and/or adjuvants include mineral oils, polybutenes, phthalates and the like. In one or more embodiments, the plasticizers may include phthalates such as diisoundecyl phthalate (DIUP), diisononylphthalate (DINP), dioctylphthalates (DOP), and polybutenes, such as Parapol 950 and Parapol 1300 available from ExxonMobil Chemical Company in Houston, Tex. Further useful plasticizers include those described in WO01/18109A1 and U.S. Application Pub. No. 2004/0106723, which are incorporated by reference herein.

In one or more embodiments, the adhesive compositions described herein may comprise from about 1 wt % to about 50 wt %, or from about 5 wt % to about 40 wt %, or from about 10 wt % to about 35 wt %, or from about 15 wt % to about 30 wt % of the optional process oil component.

Wax Component

In one or more embodiments of the present invention, one or more waxes may be added to the adhesive compositions described herein. Nonlimiting examples of waxes, which can be employed, include petroleum based and synthetic waxes. Waxes suitable for use in the present invention include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes and combinations of thereof. In embodiments, the wax components may be of the same or different types of waxes, and may be miscible or immiscible. It is common in the art to use the terminology synthetic high melting point waxes to include high density low molecular weight polyethylene waxes, by-product polyethylene waxes and Fischer-Tropsch waxes, which are useful herein.

Modified waxes, such as vinyl acetate modified, maleic anhydride modified, oxidized waxes and other polar waxes may also be used in an embodiment as previously mentioned. In one embodiment, the functionalized wax component is a single component but serves a dual function as both the functionalized polyolefin component and one or more of the wax components. In another embodiment, the adhesive is essentially free of modified waxes, i.e., it is free of deliberately added modified waxes or contains less than 1 wt % of modified waxes. In an embodiment, the wax component comprises less than 2 wt % or less than 1 wt % modified waxes by weight of the total wax components.

Preferably, the wax components are paraffin waxes, microcrystalline waxes, Fischer-Tropsch synthetic waxes, and polyethylene waxes, all of which are a blend of linear and branched hydrocarbons. Paraffin waxes are complex mixtures of many substances. They mainly consist of saturated hydrocarbons.

Microcrystalline waxes are a type of wax produced by dewaxing petrolatum, as part of the petroleum refining process. Microcrystalline wax contains a higher percentage of isoparaffinic (branched) hydrocarbons and naphthenic hydrocarbons as compared with paraffin wax. It is characterized by the fineness of its crystals in contrast to the larger crystal of paraffin wax. It consists of high molecular weight saturated aliphatic hydrocarbons, and has a high melting point. Typical microcrystalline wax crystal structure is small and thin, making the wax crystals relatively more flexible than paraffin wax crystals.

Polyolefin waxes typically have a weight average molecular weight of from 500 to 20,000 g/mol and can be produced by thermal degradation of high molecular weight branched polyolefin polymers or by direct polymerization of olefins.

In one embodiment, the adhesive composition can comprise two wax components wherein the first wax component (i.e., the low molecular weight wax component) has a weight average molecular weight (g/mol) of from 500 to 10,000, from 1,000 to 10,000, from 2,000 to 10,000, from 3,000 to 10,000, from 4,000 to 10,000, from 5,000 to 10,000, from 6,000 to 10,000, from 7,000 to 10,000, from 8,000 to 10,000, and from 9,000 to 10,000; and the second wax component (i.e., the high molecular weight wax component) has a weight average molecular weight of from 1,000 to 20,000, from 2,000 to 20,000, from 3,000 to 20,000, from 4,000 to 20,000, from 5,000 to 20,000, from 6,000 to 20,000, from 7,000 to 20,000, from 8,000 to 20,000, from 9,000 to 20,000, from 10,000 to 20,000, and from 15,000 to 20,000. Suitable polymerization processes include, for example, high-pressure technologies, in which the olefins, generally ethylene, are reacted free-radically under high pressures and temperatures to form branched waxes, and also low-pressure or Ziegler processes, in which ethylene and/or higher 1-olefins are polymerized using organometallic catalysts. Polyethylene waxes produced using metallocene catalyst have a narrower molecular weight distribution, more uniform incorporation of comonomer, and lower melting points, in comparison to the Ziegler-Natta technology. In one embodiment, the high molecular weight second wax component comprises a metallocene polyethylene wax.

In another embodiment, the molecular weight of a first wax component is sufficiently low to reduce set time, whereas a second wax component has a molecular weight sufficiently high to improve adhesion. In one embodiment, the difference between the weight average molecular weight of the first wax component ($Mw_{wax1}$) and the weight average molecular weight of the second wax component ($Mw_{wax2}$) is at least about 1000 g/mol (($Mw_{wax2} - Mw_{wax1}$)≥1000 g/mol) or at least about 2000 g/mole (($Mw_{wax2} - Mw_{wax1}$)≥2000 g/mole) or at least about 3000 g/mol (($Mw_{wax2} - Mw_{wax1}$)≥3000 g/mole) or at least about 4000 g/mol (($Mw_{wax2} - Mw_{wax1}$)≥4000 g/mol) or at least about 5000 g/mol (($MW_{wax2} - Mw_{wax1}$)≥5000 g/mol). In an embodiment, $Mw_{wax1}$ is less than about 4000, for example, from about 450 to 4000 g/mole or from about 500 to 4000 g/mole, and $Mw_{wax2}$ is above about 5000, for example, from about 5000 to 20,000 g/mole.

In one or more embodiments, the adhesive compositions described herein may comprise from about 1 to about 50 wt %, or from about 1 to about 40 wt %, or from about 1 to about 30 wt %, or from about 1 to about 20 wt % of the optional wax component.

Other Additives and Fillers

In some embodiments, one or more additional fillers or additives may be employed to achieve the properties and characteristics desired in the final adhesive formulation. Such additive and fillers are known in the art and may include, but are not limited to fillers, cavitating agents, antioxidants, surfactants, adjuvants, plasticizers, block, antiblock, colorants, color masterbatches, pigments, dyes, processing aids, UV stabilizers, neutralizers, lubricants, waxes, and/or nucleating agents. The additives may be present in any amount determined to be effective by those skilled in the art, such as, for example, from about 0.001 wt % to about 10 wt %.

Examples of suitable antioxidants include, but are not limited to, quinoline, e.g., trimethylhydroxyquinoline (TMQ); imidazole, e.g., zincmercapto toluyl imidazole (ZMTI); and conventional antioxidants, such as hindered phenols, lactones, phosphates, and hindered amines Further suitable antioxidants are commercially available from, for example, Ciba Geigy Corp. under the trade names Irgafos 168, Irganox 1010, Irganox 3790, Irganox B225, Irganox 1035, Irgafos 126, Irgastab 410, and Chimassorb 944.

Fillers, cavitating agents and/or nucleating agents suitable for use in the present invention may comprise granular, fibrous, and powder-like materials, and may include, but are not limited to, titanium dioxide, calcium carbonate, barium sulfate, silica, silicon dioxide, carbon black, sand, glass beads, mineral aggregates, talc, natural and synthetic clays, diatomaceous earth, and the like.

Processing aids, lubricants, waxes, and/or oils which may be employed in the adhesive compositions of the present invention include low molecular weight products such as wax, oil, or low Mn polymer, (low meaning having a Mn less than 5000, preferably below 4000, or below 3000, or below 2500). Waxes may include polar or non-polar waxes, functionalized waxes, polypropylene waxes, polyethylene waxes, and wax modifiers.

In addition to waxes, additives also include conventional additives known in the art, including fillers, antioxidants, adjuvants, adhesion promoters, plasticizers, oils, low molecular weight polymers, block, antiblock, pigments, processing aids, UV stabilizers, neutralizers, lubricants, surfactants nucleating agents, oxidized polyolefins, acid modified polyolefins, and/or anhydride modified polyolefins. Additives are combined with polymer compositions as individual components, in masterbatches, or combinations thereof.

Fillers include conventional fillers known to those skilled in the art, including titanium dioxide, calcium carbonate, barium sulfate, silica, silicon dioxide, carbon black, sand, glass beads, mineral aggregates, talc, and/or clay.

Antioxidants include conventional antioxidants known to those skilled in the art, including phenolic antioxidants, such as Irganox 1010, Irganox 1076 both available from Ciba-Geigy. In some embodiments adhesive compositions include less than about 3 wt % anti-oxidant.

Oils include conventional oils known to those skilled in the art, including paraffinic or napthenic oils such as Primol 352, or Primol 876 available from ExxonMobil Chemical France, S.A. in Paris, France. Preferred oils include aliphatic naphthenic oils.

Plasticizers include conventional plasticizers known to those skilled in the art, including mineral oils, phthalates, or polybutenes, such as Parapol 950 and Parapol 1300 formerly available from ExxonMobil Chemical Company in Houston Tex. Preferred plasticizers include phthalates such as di-iso-undecyl phthalate (DIUP), di-iso-nonylphthalate (DINP), and dioctylphthalates (DOP).

Adhesion promoters include conventional adhesion promoters known to those skilled in the art. Adhesion promoters include polar acids, polyaminoamides, such as Versamid 115, 125, 140, available from Henkel, urethanes, such as isocyanate/hydroxy terminated polyester systems, e.g., bonding agent TN/Mondur Cb-75 (Miles, Inc.), coupling agents, such as silane esters (Z-6020 from Dow Corning), titanate esters, such as Kr-44 available from Kenrich, reactive acrylate monomers, such as sarbox SB-600 from Sartomer, metal acid salts, such as Saret 633 from Sartomer, and polyphenylene oxide.

Low number average molecular weight ($M_n$) polymers include conventional low $M_n$ polymers known to those skilled in the art. Preferred low $M_n$ polymers include polymers of lower alpha olefins such as propylene, butene, pentene, and hexene. A particularly preferred polymer includes polybutene having a $M_n$ of less than 1000. An example of such a polymer is available under the trade name PARAPOL™ 950 from ExxonMobil Chemical Company. PARAPOL™ 950 is a liquid polybutene polymer having a Mn of 950 and a kinematic viscosity of 220cSt at 100° C., as measured by ASTM D 445. In some embodiments polar and non-polar waxes are used together in the same composition.

Adhesive compositions are composed of less than about 30 wt % additives based on the total weight of the adhesive composition. Preferably, adhesive compositions include less than about 25 wt % additives, or less than about 20 wt % additives, or less than about 15 wt % additives, or less than about 10 wt % additives. In some embodiments, additives are present at less than about 5 wt %, or less than about 3 wt %, or less than about 1 wt %, based upon the weight of the adhesive composition. Exemplary adhesive compositions are commercially available from ExxonMobil Chemical Co. as the LINXAR™ adhesive family of products.

The additives described herein can be added to the blend in pure form or in master batches.

Preparation of the Adhesive Composition

In one or more embodiments, the components of the adhesive compositions described herein may be blended by mixing, using any suitable mixing device at a temperature above the melting point of the components, e.g., at 130° C. to 180° C., for a period of time sufficient to form a homogeneous mixture, normally from about 1 to about 120 minutes depending on the type of mixing device.

In the case of continuous mixing as practiced by most commercial manufacturers, a twin screw extruder may be used to mix the adhesive components. First the propylene-based polymer components and additional components such as functionalized components are introduced into the extruder and mixed until the polymers have melted and are well mixed. Then the tackifiers are added, followed by any process oils which may be desired. To the extent pigments, antioxidants, fillers, or other additives are used, they are normally blended in with the block copolymer and propylene-based polymer components. The total mixing time is typically on the order of from about 1 to 5 minutes.

In the case of batch mixing, the propylene-based polymer components and additional components are added along with the tackifier resin component. Once all of the tackifier resin components have been added and homogeneous mix is achieved, the balance of the process oil, antioxidants, fillers, and any other additives are added. The total mixing time may run for up to 120 minutes.

Applications

The adhesive compositions described herein may be applied to any substrate. Suitable substrates may include, but are not limited to, wood, paper, cardboard, plastic, plastic film, thermoplastic, thermoplastic elastomer (TPE), thermoplastic vulcanizate (TPV), rubber, metal, metal film, metal foil (such as aluminum foil and tin foil), metallized surfaces, cloth, non-wovens (particularly polypropylene spun bonded fibers or non-wovens), spunbonded fibers, cardboard, stone, plaster, glass (including silicon oxide ($SiO_x$) coatings applied by evaporating silicon oxide onto a film surface), foam, rock, ceramics, films, polymer foams (such as polyurethane foam), substrates coated with inks, dyes, pigments, PVDC and the like or combinations thereof. Additional substrates may include polyethylene, polypropylene, polyacrylates, acrylics, polyethylene terephthalate, or blends thereof. Corona treatment, electron beam irradiation, gamma irradiation, microwave or silanization may modify any of the above substrates.

The adhesive compositions of this invention may be applied to a substrate as a melt and then cooled. The adhesive composition may be applied to a substrate using conventional coating techniques such as roller coaters, die coaters and blade coaters, generally at a temperature of from about 150° C. to about 200° C. In one or more embodiments, the adhesive composition is applied to a substrate using a slot die.

A slot die is a closed system where an adhesive composition is pumped through the system via a positive displacement pump. The slot die usually includes a rotating bar at the point of the outlet of the adhesive in order to maintain a smooth surface.

The substrate should be coated with sufficient adhesive composition to provide a dry coating weight of from about 10 to about 100, or from about 10 to about 50, or from about 15 to about 25 grams per square meter (gsm).

After coating, the coated substrate is cut to the required dimension. In the manufacture of tape, the substrate is slit into strips and rolled into a finished product. The substrate may also be cut into shaped items to provide labels or medicinal tapers. In one or more embodiments, a release liner may also be employed if desired.

In one or more embodiments of the present invention, adhesive tapes may be formed which comprise a substrate coated with one or more adhesive compositions as described herein. As used herein, the term "tape" is meant generically to encompass any manner of adhesive application, including but not limited to tapes, labels, stickers, decals, packaging applications, and the like.

Properties of the Adhesive Composition

In order to measure set time, Dot T-Peel and substrate fiber tear, adhesive test specimens are created by bonding the substrates together with a dot of about 0.3 grams of molten adhesive and compressing the bond with a 500-gram weight. The dot size is controlled by the adhesive volume such that the compressed disk which forms gives a uniform circle just inside the dimensions of the substrates.

Set time (also referred to as characteristic set time or dot set time) is defined as the time it takes for a compressed adhesive substrate construct to fasten together enough to give substrate fiber tear when pulled apart, and thus the bond is sufficiently strong to remove the compression. These set times are measured by trial and error by placing a molten dot of adhesive on to a file folder substrate (a typical manila letter size (⅓ cut) stock having a minimum of 10% post consumer recycle paper content provided by Smead Paper, stock number 153L, UPC number 10330) taped to a flat table. Three seconds later, a file folder tab (2.5 cm×7.6 cm (1 inch by 3 inch)) is placed upon the dot and compressed with a 500-gram weight. The weight is allowed to sit for a predetermined time period from about 0.5 to about 10 seconds. The construct thus formed is pulled apart to check for a bonding level good enough to produce substrate fiber tear. The procedure is repeated several instances while holding the compression for different periods, and the set time is recorded as the minimum time required for this good bonding to occur. Standards are used to calibrate the process.

Once a construct is produced it can be subjected to various insults to assess the effectiveness of the bond. Once a bond to a substrate fails a simple way to quantify the effectiveness of the adhesive is to estimate the area of the adhesive dot that retained substrate fibers as the construct failed along the bond line. This estimate is called percent substrate fiber tear. An example of good adhesion, after conditioning a sample for 15 hours at −12° C. and attempting to destroy the bond, would be an estimate of 80%-100% substrate fiber tear. It is likely that 0% substrate fiber tear under those conditions would signal a loss of adhesion.

The specimens for substrate fiber tear testing are prepared using the same procedure as that described above. All substrate fiber tears were performed at room temperature wherein the specimens are aged at ambient conditions for about 12 hours. The bonds are separated by hand and a determination made as to the type of failure observed. The amount of substrate fiber tear is expressed herein as a percentage. All the fiber tear tests are conducted using paperboard 84C (generic corrugated cardboard 200# stock provided by Huckster Packaging Supply, 6111 Griggs Road, Houston Tex. 77023) as the substrate.

In one or more embodiments, the adhesive compositions of the present invention comprise from about 5 wt % to about 90 wt % of at least two propylene-based polymer components, and at least 10 wt % of the tackifier resin component. In some embodiments, the addition of at least one wax or at least one process oil to the adhesive composition may be desirable.

In one or more embodiments of the present invention, the adhesive composition has a viscosity greater than about 250 mPa·sec, or greater than about 500 mPa·sec, or greater than about 1,000 mPa·sec, or greater than about 2,000 mPa·sec, or greater than about 5,000 mPa·sec (measured at 177° C.). Viscosity may be determined via ASTM D 3236.

Brookfield viscosity is measured using a Brookfield digital viscometer and a number 27 spindle according to ASTM D-3236 at either 177° C. or 190° C. (whichever temperature is specified).

Peak melting point (Tm), also referred to as melting point, peak crystallization temperature, (Tc), also referred to as crystallization temperature, glass transition temperature (Tg), heat of fusion (ΔHf or Hf), and percent crystallinity were determined using the following differential scanning calorimetric (DSC) procedure according to ASTM D3418-03. DSC data were obtained using a TA Instruments model Q100 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to '90° C. at a rate of 10° C./minute, followed by an isothermal for 2 minutes and heating to 200° C. at 10° C./minute. Both the first and second cycle thermal events were recorded. Areas under the endothermic peaks of the second cycle were measured and used to determine the Tc, Tm, and HF The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided however that a value of 189 J/g (B) is used as the heat of fusion for 100% crystalline polypropylene, a value of 290 J/g is used for the heat of fusion for 100% crystalline polyethylene. The melting and crystallization temperatures as well as the glass transition temperature reported here were obtained during the second heating/cooling cycle unless otherwise noted.

The determination of intermolecular compositional heterogeneity was determined by Temperature Rising Elution Fractionation (TREF). The fractionation of the propylene-based polymer was carried out by a Polymer Char TREF 200 based on a well-known principle that the solubility of a semi-crystalline copolymer is a strong function of temperature. A corresponding method is described in U.S. Pat. No. 5,008,204. The instrument is a column packed with solid stainless-steel beads. The copolymer of interest was dissolved in 1,2 ortho-dichlorobenzene (oDCB) at 160° C. for 60 min. Half of a milliliter (ml) of the polymer solution (concentration=4-5 mg/ml) was injected in the column and it was stabilized there at 140° C. for 45 min. The solution was cooled from 140° C. to −15° C. at 1° C./min and equilibrated at this temperature for 10 min. This caused the copolymer to crystallize out of the quiescent solution in successive layers of decreasing crystallinity onto the surface of the beads. Pure solvent (oDCB) was pumped for 5 min at −15° C. at a flow rate of 1 ml/min through an infrared detector. A valve was then switched to allow this chilled oDCB to flow through the column at the same flow rate at −15° C. for 10 min. The material eluted was designated as the soluble fraction of the copolymer. At this point, the heater was on and the solvent continued to flow through both the column and the infrared detector while the temperature was programmed upward at a controlled rate of 2° C./min to 140° C. The infrared detector continuously measured the concentration of the copolymer in the effluent from the column, and a continuous solubility distribution curve was obtained.

EXAMPLES

The following examples are illustrative of the invention. Materials used in the preparation of the adhesive compositions as identified in the examples are as follows:

"PE5", "PE7", "PE13" and "PE17" are propylene-ethylene random copolymers having (i) an ethylene wt % content; (ii)

Melt Flow Rate (MFR) (230° C., 2.16 kg) as determined by ASTM D-1238 (grams/10 min) as recited in Table 1; and (iii) Tm and Tc.

"PE5A", "PE11A", "PE13A" and "PE17A" are degraded products of the respective "PE5", "PE11", "PE13" and "PE17" samples such that "PE5A" is a degraded product of "PE5" and so forth. The properties of "PE5A", "PE11A", "PE13A" and "PE17A" are recited in Table 2.

"PE5B", "PE13B", "PE13C" are degraded products of the respective "PE5", "PE11", "PE13" and "PE17" samples such that "PE5B" is a degraded product of "PE5" and "PE5C" is a degraded product of "PE5B". The properties of "PE5B", "PE13B", and "PE13C are recited in Table 3.

TABLE 1

| Sample | Mn (kg/mol) | Mw (kg/mol) | C2 wt % | Tm (° C.) | Tc (° C.) | MFR @ 230° C. |
|---|---|---|---|---|---|---|
| PE5 | 91 | 161 | 5.2 | 50/128 | 84 | 26 |
| PE11 | 91 | 157 | 10.7 | 72 | 25 | 18 |
| PE13 | 92 | 204 | 13 | 55/127 | 53 | 5 |
| PE17 | 136 | 227 | 17 | 54/110 | Not detectable | 9 |

TABLE 2

| Sample | C2 wt % | Mn | Mw | Brookfield 190° C., mPa·sec | MFR @ 230° C. | Tm (° C.) | Hf (J/g) | Tc (° C.) | Tg (° C.) |
|---|---|---|---|---|---|---|---|---|---|
| PE11A | 10.7 | 29 | 56 | 14,150 | 1508 | 73 | 20 | 27 | −21 |
| PE13A | 13 | 26 | 80 | 26,700 | 1038 | 119 | 10 | 65 | −28 |
| PE17A | 17 | 23 | 52 | 12,260 | 1400 | 103 | 11 | 31 | −30 |

TABLE 3

| Sample | C2 wt % | Mn | Mw | Brookfield 190° C., mPa·sec | Tm (° C.) | Hf (J/g) | Tc (° C.) | Tg (° C.) |
|---|---|---|---|---|---|---|---|---|
| PE5B | 5.2 | 26 | 53 | 5758 | 121 | 55 | 86 | −9.7 |
| PE13B | 13 | 21 | 45 | 9250 | 45 | 59 | Not detectable | −26 |
| PE13C | 13 | 22 | 46 | 7425 | 45 | 58 | Not detectable | −26 |

"L101" is Lupersol 101 (2,5-bis(tert-butylperoxy)-2,5-dimethyl-hexane).

"HCR1" is a cycloaliphatic hydrocarbon resin having a ring and ball softening point from about 100° C. to about 106° C. HCR1 is available under the trade name Escorez 5400 from ExxonMobil Chemical Company, Baytown, Tex.

"PW3000" is POLYWAX 3000 from Baker Petrolite is fully saturated homopolymers of ethylene that have high degrees of linearity and crystallinity. This synthetic wax has narrow molecular weight distributions (Mw of 3300 g/mol, Mw/Mn of 1.10, a viscosity of 130 mPa·s at temperature of 149° C., a viscosity of 55 mPa·s at temperature of 190° C., a crystallization temperature of 115° C. and a melting temperature of 127° C.

"AC596P" is a polypropylene-maleic anhydride copolymer from Honeywell, having a Mw of 12,000 g/mol, Mw/Mn of 2.18, viscosity at 190° C. of 128 mPa·s, a crystallization temperature of 102° C., a melting temperature of 133° C., and Mettler drop point of 143° C.

"Kaydol" is KAYDOL® is a highly refined white mineral oil that consists of saturated aliphatic and alicyclic non-polar hydrocarbons having a pour point of −20° C., having a kinematic viscosity of 64 to 70 cSt at 40° C., available from Witco.

Irganox 1010 is a phenolic antioxidant having a melting point from about 110° C. to about 125° C. and a density (at 20° C.) of about 1.15 g/cm3. Irganox 1010 is available from Ciba Specialty Chemicals, Switzerland.

The degraded PE polymers used in the examples were degraded with Luperox 101 (L101). The materials are rapidly degraded in the melt at 210° C. Increasing the temperature increases the efficiency of the degradation reaction. Selected materials were degraded at 250° C. for enhanced degradation. Four PE copolymers of different composition were selected for study and are shown in Table 1. Five different concentrations of peroxide (0.4, 0.8, 1.2, 1.6 and 2.0 wt % L101) were used for each material to establish peroxide efficiency as a function of material composition. Materials were then visbroken to select MFRs for adhesive application testing.

Example 1

As can be seen in Table 4, copolymers with greater than 10 wt % ethylene incorporation formulated with a generic (non optimal) formulation exhibited good properties for hot melt adhesives as shown in Table 4. Higher MFR materials will require less formulation (higher polymer concentration).

TABLE 4

| Sample | Blend A | Blend B | Blend C | Blend D | Blend E | Blend F | Blend G | Blend H |
|---|---|---|---|---|---|---|---|---|
| PE11A | 35 | 30 | | | | | | |
| PE13A | | | 30 | 35 | 30 | | | |
| PE17A | | | | | | 30 | 35 | 30 |
| HCR1 | 45 | 50 | 55 | 45 | 50 | 55 | 45 | 50 |
| PW3000 | 10 | 10 | 10 | 10 | 10 | 10 | 10 | 10 |
| AC 596P | 5 | 5 | 5 | 5 | 5 | 5 | 5 | 5 |
| Kaydol | 5 | 5 | | 5 | 5 | | 5 | 5 |
| Irganox 1010 | 1 | 1 | 1 | 1 | 1 | 1 | 1 | 1 |
| Brookfield Viscosity 177° C. (mPa·sec) | 1252 | 955 | 1300 | 1167 | 1030 | 788 | 1125 | 920 |

TABLE 4-continued

| Sample | Blend A | Blend B | Blend C | Blend D | Blend E | Blend F | Blend G | Blend H |
|---|---|---|---|---|---|---|---|---|
| Set Time (sec) | 2.75 | 2.75 | 3 | 3 | 2.75 | 1.75 | 3 | 2.75 |
| Average Fiber Tear, % (25° C.) | 98 | 100 | 100 | 100 | 99 | 82 | 100 | 100 |

Example 2

As can be seen in Table 5, an adhesive composition comprising two propylene-based copolymers wherein one copolymer has greater than 10 wt % ethylene incorporation and the other has 10 wt % or less ethylene incorporation exhibited good properties for hot melt adhesives including good set time and good fiber tear.

TABLE 5

| Sample | Blend AB | Blend BB | Blend CB | Blend DB | Blend EB | Blend FB | Blend HB | Blend IB | Blend JB | Blend KB | Blend LB |
|---|---|---|---|---|---|---|---|---|---|---|---|
| PE5B | 50 | | 15 | 25 | 30 | 35 | | 15 | 25 | 30 | 35 |
| PE13B | | 50 | 35 | 25 | 20 | 15 | | | | | |
| PE13C | | | | | | | 50 | 35 | 25 | 20 | 15 |
| HCR1 | 35 | 35 | 35 | 35 | 35 | 35 | 35 | 35 | 35 | 20 | 15 |
| PW3000 | 10 | 10 | 10 | 10 | 10 | 10 | 10 | 10 | 10 | 35 | 35 |
| AC 596P | 5 | 5 | 5 | 5 | 5 | 5 | 5 | 5 | 5 | 10 | 10 |
| Irganox 1010 | 1 | 1 | 1 | 1 | 1 | 1 | 1 | 1 | 1 | 5 1 | 5 1 |
| Brookfield Viscosity 177° C. (mPa · s) | 1892 | 2560 | 2350 | 2207 | 2375 | 2198 | 2100 | 2077 | 2090 | 2022 | 1987 |
| Set Time (sec) | 2 | 4.5 | 3.5 | 3 | 2 | 2 | 6.5 | 3 | 3 | 1.75 | 2 |
| Average Fiber Tear, % (Room Temp) | 0 | 100 | 100 | 97 | 98 | 93 | 100 | 99 | 98 | 98 | 86 |

Example 3

"PE101", "PE102", "PE103" and "PE104" are propylene-ethylene random copolymers having (i) an ethylene wt % content of 4.5, 5.2, 5.3, and 11, respectively: (ii) a heat of fusion of 39 J/g, 36 J/g, 29 J/g, and 15 J/g, respectively; (iii) a Brookfield viscosity at 190° C. of 1,785 mPa·sec, 2,485 mPa·sec, 2,980 mPa·sec, and 2,600 mPa·sec, respectively; and (iv) Mn of 17,000, 21,000, 17,000, and 17, 000, respectively; (v) Mw of 36,000, 35,000, 34,000, and 30,000, respectively; (vi) a Tc of 52, 54, 38, and 22° C., respectively; (vii) a Tm of 93, 94, 82, and 60° C., respectively; and (viii) a Tg of −12, −13, −14, and −24° C., respectively. Samples of these polymers were formulated into hot melt adhesives and subjected to tests to evaluate performance characteristics of the hot melt adhesive, including Brookfield viscosity at 177° C., set time, % fiber tear at 25° C., % fiber tear at 2° C., % fiber tear at −18° C., melting temperature, and heat of fusion.

As can be seen in Table 6, adhesive compositions comprising only a single polymer sample (i.e., not a polymer blend) exhibited set times of 3 seconds or greater.

TABLE 6

| Sample | A | B | C | D |
|---|---|---|---|---|
| PE 101 | 88 | — | — | — |
| PE 102 | — | 88 | — | — |
| PE 103 | — | — | 88 | — |
| PE 104 | — | — | — | 88 |
| Polywax 3000 | 8 | 8 | 8 | 8 |
| AC 596P | 3 | 3 | 3 | 3 |

TABLE 6-continued

| Sample | A | B | C | D |
|---|---|---|---|---|
| Irganox 1010 | 1 | 1 | 1 | 1 |
| HMA Properties | | | | |
| Brookfield | 3315 | 2455 | 2735 | 1842 |

TABLE 6-continued

| Sample | A | B | C | D |
|---|---|---|---|---|
| Viscosity@177° C., mPa · sec | | | | |
| Set Time, s | 3.5 | 3 | 4 | 4 |
| % Fiber Tear to 84C, 25° C. | 100 | 37 | 100 | 95 |
| % Fiber Tear to 84C, 2° C. | 92 | 92 | 80 | 96 |
| % Fiber Tear to 84C, −18° C. | 88 | 93 | 93 | 88 |
| Tm, ° C. | 96, 122 | 96, 122 | 86, 122 | 63, 121 |
| Hf, J/r | 55 | 55 | 42 | 20 |

"PE105", "PE106", "PE107" and "PE108" are propylene-ethylene random copolymers having (i) an ethylene wt % content of 7.2, 4.5, 5.2, and 5.1, respectively, (ii) a heat of fusion of 36 J/g, 39 J/g, 36 J/g, and 37 J/g, respectively; (iii) a Brookfield viscosity at 190° C. of 5325 mPa·sec, 2785 mPa·sec, 2485 mPa·sec, and 1150 mPa·sec, respectively; (iv) Mn of 25,000, 17,000, 21,000, and 13,000, respectively; (v) Mw of 42,000, 36,000, 35,000, and 28,000, respectively; (vi) a Tc of 51, 52, 54, 50° C., respectively; (vii) Tm of 90, 93, 94, and 91° C., respectively; and (viii) a Tg of −15, −12, −13, and −12° C., respectively. Samples of these polymers were formulated into hot melt adhesives and subjected to tests to evaluate performance characteristics of the hot melt adhesive, including Brookfield viscosity at 177° C., set time, % Fiber tear at 25° C., % Fiber tear at 2° C., % Fiber tear at −18° C., melting temperature, and heat of fusion. The results of these tests are illustrated in Table 7.

TABLE 7

| Sample | E | F | G | H |
|---|---|---|---|---|
| PE105 | 88 | — | — | — |
| PE106 | — | 88 | — | — |
| PE107 | — | — | 88 | — |
| PE108 | — | — | — | 88 |
| Polywax 3000 | 8 | 8 | 8 | 8 |
| A-C 596P | 3 | 3 | 3 | 3 |
| Irganox 1010 | 1 | 1 | 1 | 1 |
| HMA Properties | | | | |
| Brookfield Viscosity@177° C., mPa·sec | 5612 | 3315 | 2455 | 1397 |
| Set Time, s | 3 | 3.5 | 3 | 3 |
| % Fiber Tear to 84C, 25° C. | 87 | 100 | 37 | 100 |
| % Fiber Tear to 84C, 2° C. | 87 | 92 | 92 | 0 |
| % Fiber Tear to 84C, −18° C. | 90 | 88 | 93 | 0 |
| Tm, ° C. | 93, 122 | 96, 122 | 96, 122 | 94, 122 |
| Hf, J/g | 56 | 55 | 55 | 58 |

Samples of PE108 and PE104 polymers were blended and formulated into hot melt adhesives and subjected to tests to evaluate performance characteristics of the hot melt adhesive, including Brookfield viscosity at 177° C., set time, % Fiber tear at 25° C., % Fiber tear at 2° C., % Fiber tear at −18° C., melting temperature, and heat of fusion. The results of these tests are illustrated in Table 8.

TABLE 8

| Sample | A | B | C | D | E | F | G | H |
|---|---|---|---|---|---|---|---|---|
| PE108 | 88 | 70.5 | 68.5 | 66 | 63 | 58.5 | 17.5 | — |
| PE104 | — | 17.5 | 19.5 | 22 | 25 | 29.5 | 70.5 | 88 |
| Polywax 3000 | 8 | 8 | 8 | 8 | 8 | 8 | 8 | 8 |
| A-C 596P | 3 | 3 | 3 | 3 | 3 | 3 | 3 | 3 |
| Irganox 1010 | 1 | 1 | 1 | 1 | 1 | 1 | 1 | 1 |
| HMA Properties | | | | | | | | |
| Brookfield Viscosity@177° C., mPa·sec | 1397 | 1245 | 1282 | 1267 | 1347 | 1262 | 1597 | 1842 |
| Set Time, s | 3 | 2.5 | 2.75 | 3 | 3.5 | 3.5 | 4.5 | 4 |
| % Fiber Tear to 84 C., 25° C. | 100 | 0 | 13 | 73 | 50 | 88 | 97 | 95 |
| % Fiber Tear to 84 C., 2° C. | 0 | 38 | 33 | 13 | 0 | 0 | 97 | 96 |
| % Fiber Tear to 84 C., −18° C. | 0 | 50 | 23 | 67 | 87 | 63 | 98 | 88 |
| Tm, ° C. | 94, 122 | 92, 122 | 92, 122 | 92, 122 | 92, 122 | 92, 121 | 81, 122 | 63, 121 |
| Hf, J/g | 58 | 58 | 39 | 37 | 38 | 38 | 35 | 20 |

"PH200" is a propylene-hexene random copolymer having a hexene wt % content of 10, a heat of fusion of 35 J/g, a Brookfield viscosity at 190° C. of 1565 mPa·sec, a Mn of 17,000, Mw of 45,000, Tc of 62° C., Tm of 122° C., and a Tg of −9.1° C. Samples of PE108 and PH200 polymers were blended and formulated into hot melt adhesives and subjected to tests to evaluate performance characteristics of the hot melt adhesive, including Brookfield viscosity at 177° C., set time (sec), % Fiber tear at 25° C., % Fiber tear at 2° C., % Fiber tear at −18° C., melting temperature, and heat of fusion. The results of these tests are illustrated in Table 9.

TABLE 9

| Sample | I | J | K | L | M | N |
|---|---|---|---|---|---|---|
| PE 108 | — | 11 | 22 | 33 | 44 | 88 |
| PH200 | 88 | 77 | 66 | 55 | 44 | — |
| Polywax 3000 | 8 | 8 | 8 | 8 | 8 | 8 |
| A-C 596P | 3 | 3 | 3 | 3 | 3 | 3 |
| Irganox 1010 | 1 | 1 | 1 | 1 | 1 | 1 |
| HMA Performance | | | | | | |
| Brookfield Viscosity @177° C., mPa·sec | 725 | 1457 | 1405 | 1357 | 1347 | 1270 |
| Set Time, s | 2 | 2.5 | 2.5 | 3 | 2.5 | 4.3 |
| % Fiber Tear, 25° C. | 43 | 100 | 95 | 99 | 73 | 47 |
| % Fiber Tear, 2° C. | 1.7 | 85 | 90 | 93 | 100 | 63 |
| % Fiber Tear, −18° C. | 3.3 | 73 | 88 | 83 | 65 | 63 |
| Tm, ° C. | 75, 122 | 122 | 122 | 122 | 122 | 80, 121 |
| Hf, J/g | 70 | 43 | 52 | 43 | 60 | 35 |

"PE109" is a propylene-ethylene random copolymer having an ethylene wt % content of 8.1, a heat of fusion of 26 J/g, and a Brookfield viscosity at 190° C. of 1190 mPa·sec, Mn of 17,000, Mw of 28,000, Tc of 32° C., Tm of 76° C., and Tg of −16° C. Samples of PE109 and PH200 polymers were blended and formulated into hot melt adhesives and subjected to tests to evaluate performance characteristics of the hot melt adhesive, including Brookfield viscosity at 177° C., set time, % Fiber tear at 25° C., % Fiber tear at 2° C., % Fiber tear at −18° C., melting temperature, and heat of fusion. The results of these tests are illustrated in Table 10.

TABLE 10

| Sample | O | P | Q | R | S | R |
|---|---|---|---|---|---|---|
| PE109 | — | 11 | 22 | 33 | 44 | 88 |
| PH200 | 88 | 77 | 66 | 55 | 44 | — |
| Polywax 3000 | 8 | 8 | 8 | 8 | 8 | 8 |
| A-C 596P | 3 | 3 | 3 | 3 | 3 | 3 |
| Irganox 1010 | 1 | 1 | 1 | 1 | 1 | 1 |
| HMA Performance | | | | | | |
| Brookfield Viscosity | 725 | 1460 | 1420 | 1422 | 1387 | 1397 |

TABLE 10-continued

| Sample | O | P | Q | R | S | R |
|---|---|---|---|---|---|---|
| @177° C., mPa·sec | | | | | | |
| Set Time, s | 2 | 3.25 | 2.5 | 2.5 | 3 | 3 |
| % Fiber Tear, 25° C. | 43 | 98 | 100 | 99 | 99 | 100 |
| % Fiber Tear, 2° C. | 1.7 | 100 | 95 | 98 | 93 | 0 |
| % Fiber Tear, −18° C. | 3.3 | 47 | 88 | 93 | 91 | 0 |
| Tm, °C. | 75, 122 | 122 | 122 | 122 | 122 | 95, 122 |
| Hf, J/g | 70 | 46 | 45 | 47 | 55 | 58 |

As can be seen in Tables 9 and 10, some polymer blends exhibited improved set time and fiber tear relative to hot melt adhesive formulations comprising only one propylene-based polymer. The Brookfield viscosities exhibited by some of the blended samples was also comparable to other hot melt adhesives (e.g., less than 1500 mPa·sec).

Example 4

"PE110" is a propylene-ethylene random copolymers having an ethylene wt % content of 5.6, a heat of fusion of 54 J/g, a Brookfield viscosity at 190° C. of 1847 mPa·sec, Mn of 17,000, Mw of 40,000, Tc of 67° C., Tm of 106° C., Tm of 106° C., and a Tg of −14° C. Samples of PE104 (from Example 3) and PE110 polymers were blended and formulated into hot melt adhesives and subjected to tests to evaluate performance characteristics of the hot melt adhesive, including Brookfield viscosity at 177° C., set time, % Fiber tear at 25° C., % Fiber tear at 2° C., % Fiber tear at −18° C., melting temperature, and heat of fusion. The results of these tests are illustrated in Tables 11 and 12.

In Table 12, the measured values of heat stress failure temperature (HSFT) are shown. This high temperature resistance test was performed with a Heat Stress Tester manufactured by IAS Corporation, Hampton, Va. The test sample was in the form of a lap shear joint with an overlap length of 1" constructed by a circular dot (wt. of about 0.2 grams) of the hot melt adhesive to be tested with two pieces of 1"×3" Inland cardboard coupons. A molten dot of adhesive was placed close to the end of one Inland coupon. The end of the other Inland coupon was placed upon the dot and compressed with a 500-gram weight. The weight was allowed to sit until the adhesive became solidified. For a given adhesive to be tested, the ends of five of these lap shear test specimens were clamped on the Heat Stress Tester. A certain weight was placed on the other ends of these five test specimens. The whole setup was then transferred inside a heating oven preheated to about 50° C. The oven was then heated at a rate of 1° C./3 minutes up to a maximum temperature of about 125° C. HSFT was the average of the temperatures at which the lap shear test specimens failed inside the oven.

TABLE 11

| Sample | A | B | C | D | E | F | G | H |
|---|---|---|---|---|---|---|---|---|
| PE110 | 88 | 70.5 | 68.5 | 66 | 63 | 58.5 | 17.5 | — |
| PE104 | — | 17.5 | 19.5 | 22 | 25 | 29.5 | 70.5 | 88 |
| Polywax 3000 | 8 | 8 | 8 | 8 | 8 | 8 | 8 | 8 |
| A-C 596P | 3 | 3 | 3 | 3 | 3 | 3 | 3 | 3 |
| Irganox 1010 | 1 | 1 | 1 | 1 | 1 | 1 | 1 | 1 |
| PE110/PE104, Wt Ratio | 100/0 | 80/20 | 78/22 | 75/25 | 72/28 | 67/33 | 20/80 | 0/100 |
| HMA Performance | | | | | | | | |
| Brookfield Viscosity@177° C., mPa·sec | 1932 | 2002 | 1890 | 1887 | 1892 | 1860 | 1797 | 1842 |
| Set Time, s | 2 | 2 | 1.75 | 2.5 | 2 | 2.5 | 2.75 | 4 |
| % Fiber Tear to 84 C., 25° C. | 79 | 100 | 100 | 92 | 87 | 93 | 100 | 95 |
| % Fiber Tear to 84 C., 2° C. | 92 | 96 | 87 | 95 | 93 | 50 | 72 | 96 |
| % Fiber Tear to 84 C., −18° C. | 90 | 97 | 94 | 94 | 88 | 88 | 90 | 88 |
| Tm, °C. | 108, 122 | 107, 122 | 107, 122 | 107, 122 | 107, 123 | 107, 122 | 100, 122 | 63, 121 |
| Hf, J/g | 86 | 55 | 54 | 51 | 57 | 51 | 30 | 20 |

TABLE 12

| Sample | I | J | K | L | M | N | O | P |
|---|---|---|---|---|---|---|---|---|
| PE110 | 80 | 64 | 62 | 60 | 57 | 53.5 | 16 | — |
| PE104 | — | 16 | 18 | 20 | 23 | 26.5 | 64 | 80 |
| HCR1 | 8 | 8 | 8 | 8 | 8 | 8 | 8 | 8 |
| Polywax 3000 | 8 | 8 | 8 | 8 | 8 | 8 | 8 | 8 |
| A-C 596P | 3 | 3 | 3 | 3 | 3 | 3 | 3 | 3 |
| Irganox 1010 | 1 | 1 | 1 | 1 | 1 | 1 | 1 | 1 |
| PE110/PE104, Wt Ratio | 100/0 | 80/20 | 78/22 | 75/25 | 72/28 | 67/33 | 20/80 | 0/100 |
| HMA Performance | | | | | | | | |
| Brookfield Viscosity@177° C., mPa·sec | 1632 | 1627 | 1610 | 1642 | 1635 | 1630 | 1605 | 1597 |

TABLE 12-continued

| Sample | I | J | K | L | M | N | O | P |
|---|---|---|---|---|---|---|---|---|
| Set Time, s | 1.5 | 1.75 | 1.75 | 1.75 | 1.75 | 1.75 | 2 | 4 |
| % Fiber Tear to 84 C., 25° C. | 90 | 93 | 88 | 95 | 96 | 97 | 97 | 100 |
| % Fiber Tear to 84 C., 2° C. | 95 | 87 | 91 | 89 | 90 | 93 | 94 | 94 |
| % Fiber Tear to 84 C., −18° C. | 87 | 68 | 85 | 87 | 92 | 85 | 92 | 97 |
| HSFT, ° C. | 88 | 75 | 74 | 74 | 74 | 69 | 56 | 53 |
| $T_m$, ° C. | 106, 120 | 106, 121 | 106, 121 | 106, 120 | 105, 120 | 106, 121 | 101, 120 | 120 |
| $H_f$, J/g | 62 | 58 | 51 | 54 | 46 | 47 | 31 | 22 |

As can be seen in Tables 11 and 12, improved set times and fiber tear performance were exhibited by the tested blends where the weight content ratio between the more crystalline polymer to less crystalline polymer was between 4:1 and 1:4. In samples that were not enhanced with a tackifier resin component, even greater fiber tear performance was observed in samples where the weight content ratio between the more crystalline polymer to less crystalline polymer was about 3.5:1 to about 4:1.

Example 5

"PE110", "PE104", "PE402" and "PE403" are propylene-ethylene random copolymers having (i) an ethylene wt % content of 5.6, 11, 1.8, and 15, respectively, and (ii) a heat of fusion of 54 J/g, 15 J/g, 62 J/g and 15 J/g, respectively, (iii) a Brookfield viscosity at 190° C. of 1847 mPa·sec, 2600 mPa·sec, 525 mPa·sec and 510 mPa·sec, respectively, (iv) Mn of 17,000, 17,000, 13,000, and 10,000, respectively, (v) Tc of 67, 22, 75, 10° C., respectively (vi) Tm of 106, 60, 112, and 55° C., respectively, and (vii) about −14, −24, −10, and −31° C., respectively. Samples of these polymers were blended and formulated into hot melt adhesives and subjected to tests to evaluate performance characteristics of the hot melt adhesive, including Brookfield viscosity at 177° C., set time (sec), % Fiber tear at 25° C., % Fiber tear at 2° C., % Fiber tear at −18° C., melting temperature, and heat of fusion. The results of these tests are illustrated in Table 13.

TABLE 13

| Sample | A | B | C | D | E | F | G | H | I |
|---|---|---|---|---|---|---|---|---|---|
| PE110 | 80 | 64 | 60 | 48 | 40 | 32 | 20 | 16 | — |
| PE403 | — | 16 | 20 | 32 | 40 | 48 | 60 | 64 | 80 |
| Polywax 3000 | 8 | 8 | 8 | 8 | 8 | 8 | 8 | 8 | 8 |
| HCR1 | 8 | 8 | 8 | 8 | 8 | 8 | 8 | 8 | 8 |
| A-C 596P | 3 | 3 | 3 | 3 | 3 | 3 | 3 | 3 | 3 |
| Irganox 1010 | 1 | 1 | 1 | 1 | 1 | 1 | 1 | 1 | 1 |
| PE110/PE403, Wt Ratio | 100/0 | 80/20 | 75/25 | 60/40 | 50/50 | 40/60 | 25/75 | 20/80 | 0/100 |
| HMA Performance | | | | | | | | | |
| Brookfield Viscosity@177° C., mPa · sec | 1632 | 1180 | 1110 | 950 | 828 | 730 | 615 | 580 | 435 |
| Set Time, s | 1.5 | 1.5 | 1.5 | 1.5 | 1.5 | 1.5 | 2 | 3.5 | 10+ |
| % Fiber Tear to 84 C., 25° C. | 90 | 99 | 100 | 100 | 100 | 100 | 100 | 100 | 100 |
| % Fiber Tear to 84 C., 2° C. | 95 | 70 | 86 | 95 | 98 | 99 | 99 | 98 | 98 |
| % Fiber Tear to 84 C., −18° C. | 87 | 90 | 83 | 98 | 95 | 95 | 97 | 94 | 99 |

TABLE 14

| SAMPLE | J | K | L | M | N | O | P | Q | R | S | T | U |
|---|---|---|---|---|---|---|---|---|---|---|---|---|
| PE402 | 99 | 80 | 64 | 62 | 60 | 57 | 48 | 40 | 32 | 20 | 16 | — |
| PE104 | — | — | 16 | 18 | 20 | 23 | 32 | 40 | 48 | 60 | 64 | 80 |
| Polywax 3000 | — | 8 | 8 | 8 | 8 | 8 | 8 | 8 | 8 | 8 | 8 | 8 |
| HCR1 | — | 8 | 8 | 8 | 8 | 8 | 8 | 8 | 8 | 8 | 8 | 8 |
| A-C 596P | — | 3 | 3 | 3 | 3 | 3 | 3 | 3 | 3 | 3 | 3 | 3 |
| Irganox 1010 | 1 | 1 | 1 | 1 | 1 | 1 | 1 | 1 | 1 | 1 | 1 | 1 |
| Polymer1/Polymer 2, Wt Ratio | 100/0 | 100/0 | 80/20 | 78/22 | 75/25 | 72/28 | 60/40 | 50/50 | 40/60 | 25/75 | 20/80 | 0/100 |
| HMA Performance | | | | | | | | | | | | |
| Brookfield Viscosity@177° C., mPa · sec | 512 | 385 | 532 | 555 | 569 | 620 | 695 | 787 | 902 | 1015 | 1115 | 1597 |

TABLE 14-continued

| SAMPLE | J | K | L | M | N | O | P | Q | R | S | T | U |
|---|---|---|---|---|---|---|---|---|---|---|---|---|
| Set Time, s | 10+ | 8.5 | 5.5 | 4 | 3 | 2.5 | 1.25 | 1.25 | 1.25 | 1.25 | 1.5 | 4 |
| % Fiber Tear to 84 C., 25° C. | 0 | 0 | 0 | 0 | 0 | 6.7 | 73 | 48 | 98 | 100 | 100 | 100 |
| % Fiber Tear to 84 C., 2° C. | 0 | 0 | 1 | 0 | 1 | 2.3 | 73 | 63 | 95 | 100 | 100 | 94 |
| % Fiber Tear to 84 C., −18° C. | 0 | 0 | 1 | 0 | 1.7 | 23 | 35 | 47 | 90 | 88 | 98 | 97 |

Table 13 illustrates data for blends of PE110 and PE403, which may be referred to as conventional blends. The term "conventional blend" as used herein is not intended to imply that a particular copolymer or blend of polymers is commonly known or ordinary, but instead refers to a blend of a copolymer with high $H_f$ and high Brookfield viscosity with another copolymer with low $H_f$ and low Brookfield viscosity. In the present example, PE110 has a relatively high heat of fusion (54 J/g) and relatively high Brookfield viscosity (1847 mPa·sec), whereas PE403 has a relatively low heat of fusion (15 J/g) and a relatively low Brookfield viscosity (510 mPa·sec). For the tested conventional blends, excellent set time, fiber tear performance and Brookfield viscosity were exhibited by HMA formulations in which (i) the weight content ratio of the more crystalline copolymer to less crystalline polymer was between about 1.5:1 and 1:1.5; (ii) where the difference in ethylene content was at least 2 mol %, or at least 3 mol %, or at least 5 mol %, or at least 10%, or at least 12%; (iii) where the difference in heat of fusion was at least 5 J/g, or at least 10 J/g, or at least 15 J/g, or at least 20 J/g or at least 25 J/g, or at least 30 J/g, or at least 35 J/g, and/or (iv) where the difference in Brookfield viscosity at 190° C. was at least 200 mPa·sec, or at least 300 mPa·sec, or at least 400 mPa·sec, or at least 500 mPa·sec, or at least 700 mPa·sec, or at least 1000 mPa·sec, or at least 1200 mPa·sec.

Table 14 illustrates data for blends of PE104 and PE402, which may be referred to as orthogonal blends. The term "orthogonal blend" as used herein refers to a blend of a copolymer with high $H_f$ and low Brookfield viscosity with another copolymer with low $H_f$ and high Brookfield viscosity. In the present example, PE402 has a relatively high heat of fusion (62 J/g) and low Brookfield viscosity (525 mPa·sec), whereas PE104 has a relatively low heat of fusion (15 J/g) and high Brookfield viscosity (2600 mPa·sec). For the tested orthogonal blends, excellent set time, fiber tear performance and Brookfield viscosity were exhibited by HMA formulations in which (i) the weight content ratio of the more crystalline copolymer to less crystalline polymer was between about 1:1.5 and about 1:4; (ii) where the difference in ethylene content was at least 2 mol %, or at least 3 mol %, or at least 5 mol %, or at least 10 mol %, or at least 12 mol %; (iii) where the difference in heat of fusion was at least 5 J/g, or at least 10 J/g, or at least 15 J/g, or at least 20 J/g or at least 25 J/g, or at least 30 J/g, or at least 35 J/g or at least 40 J/g; and/or (iv) where the difference in Brookfield viscosity at 190° C. was at least 200 mPa·sec, or at least 300 mPa·sec, or at least 400 mPa·sec, or at least 500 mPa·sec, or at least 700 mPa·sec, or at least 1000 mPa·sec, or at least 1200 mPa·sec, or at least 1500 mPa·sec, or at least 2000 mPa·sec.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

The invention claimed is:

1. An adhesive composition comprising:
   a. a first propylene-based copolymer component comprising propylene and at least one comonomer wherein the first propylene-based copolymer component has a propylene content of greater than 50 mol % and a weight average molecular weight of 100,000 or less; and
   b. a second propylene-based copolymer component comprising propylene and at least one comonomer wherein the second propylene-based copolymer component has a propylene content of greater than 50 mol %, a comonomer content of at least 2 mol % greater than the comonomer content of the first propylene-based copolymer component, and a weight average molecular weight of 100,000 or less;
   wherein the first propylene-based copolymer has a heat of fusion of between about 1 and about 120 J/g and wherein the second propylene-based copolymer has a heat of fusion of between about 1 and about 100 J/g;
   wherein the at least one comonomer of the first propylene-based copolymer component and the second propylene-based copolymer component is ethylene; and
   wherein the second propylene-based polymer component has a viscosity of 1,500 mPa·sec or more at 190° C.

2. The adhesive composition of claim 1, wherein the comonomer content of the second propylene-based copolymer component is at least 4 mol % greater than the comonomer content of the first propylene-based copolymer component.

3. The adhesive composition of claim 1, wherein the difference in comonomer content between the first propylene-based copolymer component and the second propylene-based copolymer component is about 2 mol % to about 16 mol %.

4. The adhesive composition of claim 1, wherein the comonomer content of the first propylene-based copolymer component is greater than 1 mol % and the comonomer content of the second propylene-based copolymer component is greater than 5 mol %.

5. The adhesive composition of claim 1, wherein the weight content ratio of the first propylene-based copolymer component to second propylene-based copolymer component is greater than 3:1 in the adhesive composition.

6. The adhesive composition of claim 1, wherein the weight content ratio of the first propylene-based copolymer component to second propylene-based copolymer component is between about 4:1 to about 1:4 and wherein the first propylene-based copolymer component and second propylene-based copolymer component comprise at least 50 wt % of the adhesive composition.

7. The adhesive composition of claim 1, wherein the first propylene-based copolymer component and the second propylene-based copolymer component have a difference in heat of fusion of at least 20 J/g.

8. The adhesive composition of claim 1, wherein the first propylene-based copolymer component and the second propylene-based copolymer component have a difference in heat of fusion of at least 30 J/g.

9. The adhesive composition of claim 1, further comprising at least one tackifier resin component.

10. The adhesive composition of claim 1, further comprising at least one functionalized component.

11. The adhesive composition of claim 1, further comprising at least one block copolymer.

12. The adhesive composition of claim 1, further comprising at least one ester copolymer.

13. The adhesive composition of claim 1, wherein the adhesive composition comprises from 1 wt % to 50 wt % of the first propylene-based copolymer and from 1 wt % to 50 wt % of the second propylene-based copolymer component.

14. The adhesive composition of claim 1, wherein the adhesive composition comprises from 1 wt % to 70 wt % of the first propylene-based copolymer and from 1 wt % to 70 wt % of the second propylene-based copolymer component and from 10 wt % to 50 wt % tackifier resin component.

15. The adhesive composition of claim 1, wherein the set time is less than 3 seconds and the fiber tear is greater than 80%.

16. The adhesive composition of claim 1, wherein the first propylene-based copolymer component and second propylene-based copolymer component have an MFR of greater than 500 dg/min.

17. The adhesive composition of claim 1, wherein each of the first propylene-based copolymer component and second propylene-based copolymer component have a Brookfield Viscosity of greater than 500 mPa·sec (as measured by ASTM D 3236 at 190° C.).

18. The adhesive composition of claim 1, wherein the first propylene-based copolymer component has a heat of fusion of greater than 30 J/g and the second propylene-based copolymer component has a heat of fusion of less than 20 J/g.

19. The adhesive composition of claim 1, wherein the first propylene-based copolymer component has a comonomer content of from 1 mol % to 14 mol % and the second propylene-based copolymer component has a comonomer content of from 14 mol % to 50 mol %.

20. An adhesive composition comprising:
a. a first propylene-based copolymer component comprising propylene and at least one comonomer wherein the first propylene-based copolymer component has a propylene content of greater than 50 mol % and a weight average molecular weight of 100,000 or less; and b. a second propylene-based copolymer component comprising propylene and at least one comonomer wherein the second propylene-based copolymer component has a propylene content of greater than 50 mol %, a heat of fusion of at least 10 J/g less than the heat of fusion of the first propylene-based copolymer component, a comonomer content of at least 2 mol % greater than the comonomer content of the first propylene-based copolymer component, and a weight average molecular weight of less than 100,000 or less;
wherein the first propylene-based copolymer has a heat of fusion of between about 1 and about 120 J/g and wherein the second propylene-based copolymer has a heat of fusion of between about 1 and about 100 J/g;
wherein the at least one comonomer of the first propylene-based copolymer component and the second propylene-based copolymer component is ethylene; and
wherein the second propylene-based polymer component has a viscosity of 1,500 mPa·sec or more at 190° C.

21. A hot melt adhesive composition comprising:
a. from 1 wt % to 70 wt % of a first propylene-based copolymer component comprising propylene and at least one comonomer wherein the first propylene-based copolymer component has a propylene content of greater than 50 mol %, a comonomer content of less than 14 mol %, a heat of fusion of greater than 30 J/g, and a Brookfield viscosity of greater than 500 mPa·sec at 190° C.;
b. from 1 wt % to 70 wt % of a second propylene-based copolymer component comprising propylene and at least one comonomer wherein the second propylene-based copolymer component has a propylene content of greater than 50 mol %, a comonomer content of greater than 14 mol % and at least 2 mol % greater than the comonomer content of the first propylene-based copolymer component, a heat of fusion that is at least 10 J/g less than the first propylene-based polymer component, and a Brookfield viscosity of greater than 500 mPa·sec at 190° C.;
c. from 1 wt % to 80 wt % of a tackifier resin component; and
d. from 1 wt % to 20 wt % of a wax;
wherein the first propylene-based copolymer has a heat of fusion of between about 1 and about 120 J/g and wherein the second propylene-based copolymer has a heat of fusion of between about 1 and about 100 J/g;
wherein the at least one comonomer of the first propylene-based copolymer component and the second propylene-based copolymer component is ethylene; and
wherein the second propylene-based polymer component has a viscosity of 1,500 mPa·sec or more at 190° C.

22. The adhesive composition of claim 1, further comprising (c) a functional component, wherein the functional component is present in the amount of less than 15 wt %.

23. The adhesive composition of claim 20, further comprising (c) a functional component, wherein the functional component is present in the amount of less than 15 wt %.

24. The adhesive composition of claim 21, further comprising (e) a functional component, wherein the functional component is present in the amount of less than 15 wt %.

* * * * *